US009883498B2

United States Patent
Shimezawa et al.

(10) Patent No.: US 9,883,498 B2
(45) Date of Patent: Jan. 30, 2018

(54) MOBILE STATION APPARATUS, BASE STATION APPARATUS, COMMUNICATION METHOD AND INTEGRATED CIRCUIT

(71) Applicant: Sharp Kabushiki Kaisha, Osaka-shi, Osaka (JP)

(72) Inventors: Kazuyuki Shimezawa, Osaka (JP); Toshizo Nogami, Osaka (JP); Shoichi Suzuki, Osaka (JP); Kimihiko Imamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 341 days.

(21) Appl. No.: 14/439,269

(22) PCT Filed: Oct. 31, 2013

(86) PCT No.: PCT/JP2013/079627
§ 371 (c)(1),
(2) Date: Apr. 29, 2015

(87) PCT Pub. No.: WO2014/069598
PCT Pub. Date: May 8, 2014

(65) Prior Publication Data
US 2015/0296488 A1  Oct. 15, 2015

(30) Foreign Application Priority Data
Nov. 1, 2012 (JP) .................. 2012-241504

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS

2013/0114529 A1* 5/2013 Chen .................. H04L 1/1812
370/329
2015/0257131 A1* 9/2015 Wong .................. H04L 5/001
370/329

FOREIGN PATENT DOCUMENTS

CN  WO 2014047846 A1 *  4/2014  ............. H04L 5/001

OTHER PUBLICATIONS

"3rd Generation Partnership Project; Technical Specification Group Radio Access Network; Evolved Universal Terrestrial Radio Access (E-UTRA); Physical Layer Procedures (Release 11)", 3GPP TS 36.213, V11.0.0, Sep. 18, 2012, 143 pages.
(Continued)

*Primary Examiner* — Kibrom T Hailu
(74) *Attorney, Agent, or Firm* — Keating & Bennett, LLP

(57) ABSTRACT

In a wireless communication system in which a base station communicates with a terminal, the base station efficiently notifies of control information for the terminal. A base station apparatus maps an EPDCCH to any of candidates of the EPDCCH included in each of a first EPDCCH set and a second EPDCCH set which are configured by RRC signaling, and a mobile station apparatus monitors the candidate of the EPDCCH. The candidate of EPDCCH is determined at least based on the number of resource elements satisfying a predetermined criterion in one of physical resource block pairs that are configured for EPDCCH transmission in the first EPDCCH set.

18 Claims, 11 Drawing Sheets

(52) U.S. Cl.
CPC ....... *H04W 72/0406* (2013.01); *H04L 5/0007* (2013.01); *H04L 5/0035* (2013.01)

(56) References Cited

OTHER PUBLICATIONS

HTC, "Discussion on EPDCCH Sets and Number of EPDCCH Decoding Candidates", 3GPP TSG-RAN WG1, Meeting #70bis, R1-124352, Sep. 29, 2012, 6 pages.
Samsung, "ECCE Aggregation Levels and RE Threshold in a PRB Pair", 3GPP TSG RAN WG1, #70bis, R1-124377, Sep. 29, 2012, 4 pages.
3rd Generation Partnership Project; Technical Specification Group Radio Access Network; Coordinated Multi-Point Operation for LTE Physical Layer Aspects (Release 11), 3GPP TR 36.819 V11.0.0, Sep. 2011, 68 pages.
Panasonic, "EPDCCH Search Space and Aggregation Levels", 3GPP TSG RAN WG1 Meeting #70bis, R1-124555, Oct. 8-12, 2012, 6 pages.
NTT Docomo, "Views on Aggregation Level for EPDCCH", 3GPP TSG RAN WG1 Meeting #70bis, R1-124255, Oct. 8-12, 2012, pp. 1-4.
Sharp, "Details of eREG and eCCE Structures", 3GPP TSG RAN WG1 Meeting #70, R1-123264, Aug. 13-17, 2012, 9 pages.
Sharp, "Resource Mapping for ePDCCH", 3GPP TSG RAN WG1 Meeting #69, R1-122388, May 21-25, 2012, pp. 1-8.

\* cited by examiner

FIG. 6

| EREG NUMBER | COMBINATION OF RESOURCE ELEMENTS (k, l) IN SLOT 0 | COMBINATION OF RESOURCE ELEMENTS (k, l) IN SLOT 1 |
|---|---|---|
| 0 | (0,0), (4,1), (8,2), (0,4), (8,5) | (8,0), (0,2), (4,3), (8,4) |
| 1 | (1,0), (5,1), (9,2), (1,4), (9,5) | (9,0), (1,2), (5,3), (9,4) |
| 2 | (2,0), (6,1), (10,2), (2,4), (2,6) | (10,0), (2,2), (6,3), (10,4) |
| 3 | (3,0), (7,1), (11,2), (3,4), (3,6) | (11,0), (3,2), (7,3), (11,4) |
| 4 | (4,0), (8,1), (0,3), (4,4), (4,6) | (0,1), (4,2), (8,3), (2,5) |
| 5 | (5,0), (9,1), (1,3), (5,4), (7,6) | (1,1), (5,2), (9,3), (3,5) |
| 6 | (6,0), (10,1), (2,3), (6,4), (8,6) | (2,1), (6,2), (10,3), (4,5) |
| 7 | (7,0), (11,1), (3,3), (7,4), (9,6) | (3,1), (7,2), (11,3), (7,5) |
| 8 | (8,0), (0,2), (4,3), (8,4) | (0,0), (4,1), (8,2), (0,4), (8,5) |
| 9 | (9,0), (1,2), (5,3), (9,4) | (1,0), (5,1), (9,2), (1,4), (9,5) |
| 10 | (10,0), (2,2), (6,3), (10,4) | (2,0), (6,1), (10,2), (2,4), (2,6) |
| 11 | (11,0), (3,2), (7,3), (11,4) | (3,0), (7,1), (11,2), (3,4), (3,6) |
| 12 | (0,1), (4,2), (8,3), (2,5) | (4,0), (8,1), (0,3), (4,4), (4,6) |
| 13 | (1,1), (5,2), (9,3), (3,5) | (5,0), (9,1), (1,3), (5,4), (7,6) |
| 14 | (2,1), (6,2), (10,3), (4,5) | (6,0), (10,1), (2,3), (6,4), (8,6) |
| 15 | (3,1), (7,2), (11,3), (7,5) | (7,0), (11,1), (3,3), (7,4), (9,6) |

FIG. 7

| | COMBINATION OF EPDCCH CANDIDATE NUMBERS (AL1, AL2, AL4, AL8, AL16) | |
|---|---|---|
| N | EPDCCH SET <FIRST CONDITIONS> | EPDCCH SET <SECOND CONDITIONS> |
| 2 | (0, 2, 1, 0, 0) | (8, 4, 2, 1, 0) |
| 4 | (0, 4, 2, 1, 0) | (4, 6, 3, 2, 1) |
| 8 | (0, 8, 4, 2, 1) | (4, 6, 2, 2, 2) |

FIG. 8

| $N_1$ | $N_2$ | COMBINATION OF EPDCCH CANDIDATE NUMBERS (AL1, AL2, AL4, AL8, AL16) | |
|---|---|---|---|
| | | FIRST EPDCCH SET <FIRST CONDITIONS> | SECOND EPDCCH SET <FIRST CONDITIONS> |
| 2 | 2 | (0, 2, 1, 0, 0) | (0, 2, 1, 0, 0) |
| 2 | 4 | (0, 2, 1, 0, 0) | (0, 4, 2, 1, 0) |
| 2 | 8 | (0, 2, 1, 0, 0) | (0, 8, 3, 1, 1) |
| 4 | 2 | (0, 4, 2, 1, 0) | (0, 2, 1, 0, 0) |
| 4 | 4 | (0, 4, 2, 1, 0) | (0, 4, 2, 1, 0) |
| 4 | 8 | (0, 3, 2, 1, 0) | (0, 6, 2, 1, 1) |
| 8 | 2 | (0, 8, 3, 1, 1) | (0, 2, 1, 0, 0) |
| 8 | 4 | (0, 6, 2, 1, 1) | (0, 3, 2, 1, 0) |
| 8 | 8 | (0, 4, 2, 1, 1) | (0, 4, 2, 1, 1) |

FIG. 9

| $N_1$ | $N_2$ | COMBINATION OF EPDCCH CANDIDATE NUMBERS (AL1, AL2, AL4, AL8, AL16) | |
|---|---|---|---|
| | | FIRST EPDCCH SET <FIRST CONDITIONS> | SECOND EPDCCH SET <SECOND CONDITIONS> |
| 2 | 2 | (0, 2, 1, 0, 0) | (2, 2, 1, 1, 0) |
| 2 | 4 | (0, 2, 1, 0, 0) | (4, 3, 1, 1, 1) |
| 2 | 8 | (0, 2, 1, 0, 0) | (4, 6, 2, 2, 1) |
| 4 | 2 | (0, 4, 2, 1, 0) | (2, 2, 1, 1, 0) |
| 4 | 4 | (0, 4, 2, 1, 0) | (2, 3, 1, 1, 1) |
| 4 | 8 | (0, 3, 2, 1, 0) | (4, 6, 2, 2, 1) |
| 8 | 2 | (0, 8, 3, 1, 1) | (2, 1, 1, 1, 0) |
| 8 | 4 | (0, 6, 2, 1, 1) | (2, 3, 1, 1, 1) |
| 8 | 8 | (0, 4, 2, 1, 1) | (4, 4, 2, 2, 1) |

FIG. 10

| $N_1$ | $N_2$ | COMBINATION OF EPDCCH CANDIDATE NUMBERS (AL1, AL2, AL4, AL8, AL16) | |
|---|---|---|---|
| | | FIRST EPDCCH SET <SECOND CONDITIONS> | SECOND EPDCCH SET <FIRST CONDITIONS> |
| 2 | 2 | (2, 2, 1, 1, 0) | (0, 2, 1, 0, 0) |
| 2 | 4 | (2, 2, 1, 1, 0) | (0, 4, 2, 1, 0) |
| 2 | 8 | (2, 1, 1, 1, 0) | (0, 8, 3, 1, 1) |
| 4 | 2 | (4, 3, 1, 1, 1) | (0, 2, 1, 0, 0) |
| 4 | 4 | (2, 3, 1, 1, 1) | (0, 4, 2, 1, 0) |
| 4 | 8 | (2, 3, 1, 1, 1) | (0, 6, 2, 1, 1) |
| 8 | 2 | (4, 6, 2, 2, 1) | (0, 2, 1, 0, 0) |
| 8 | 4 | (4, 6, 2, 2, 1) | (0, 3, 2, 1, 0) |
| 8 | 8 | (4, 4, 2, 2, 1) | (0, 4, 2, 1, 1) |

FIG. 11

| $N_1$ | $N_2$ | COMBINATION OF EPDCCH CANDIDATE NUMBERS (AL1, AL2, AL4, AL8, AL16) | |
|---|---|---|---|
| | | FIRST EPDCCH SET <SECOND CONDITIONS> | SECOND EPDCCH SET <SECOND CONDITIONS> |
| 2 | 2 | (1, 2, 1, 0, 0) | (2, 2, 1, 1, 0) |
| 2 | 4 | (1, 2, 1, 0, 0) | (4, 3, 1, 1, 1) |
| 2 | 8 | (1, 1, 1, 1, 0) | (4, 6, 2, 2, 1) |
| 4 | 2 | (4, 3, 1, 1, 1) | (1, 1, 1, 1, 0) |
| 4 | 4 | (2, 3, 1, 1, 1) | (2, 3, 1, 1, 1) |
| 4 | 8 | (2, 3, 1, 1, 1) | (2, 6, 2, 2, 1) |
| 8 | 2 | (4, 6, 2, 2, 1) | (2, 1, 1, 1, 0) |
| 8 | 4 | (4, 6, 2, 2, 1) | (2, 3, 1, 1, 1) |
| 8 | 8 | (4, 4, 2, 2, 1) | (4, 4, 2, 2, 1) |

FIG. 12

| | | COMBINATION OF EPDCCH CANDIDATE NUMBERS (AL1, AL2, AL4, AL8, AL16) | | | |
|---|---|---|---|---|---|
| | | WHEN AT LEAST ONE OF FIRST EPDCCH SET AND SECOND EPDCCH SET CORRESPONDS TO FIRST CONDITIONS | | WHEN FIRST EPDCCH SET AND SECOND EPDCCH SET CORRESPOND TO SECOND CONDITIONS | |
| $N_1$ | $N_2$ | FIRST EPDCCH SET | SECOND EPDCCH SET | FIRST EPDCCH SET | SECOND EPDCCH SET |
| 2 | 2 | (4, 2, 1, 0, 0) | (2, 2, 1, 0, 0) | (1, 2, 1, 0, 0) | (2, 2, 1, 1, 0) |
| 2 | 4 | (2, 2, 1, 0, 0) | (0, 4, 2, 1, 0) | (1, 2, 1, 0, 0) | (4, 3, 1, 1, 1) |
| 2 | 8 | (0, 2, 1, 0, 0) | (0, 8, 2, 1, 1) | (1, 1, 1, 1, 0) | (4, 6, 2, 2, 1) |
| 4 | 2 | (0, 4, 2, 1, 0) | (4, 2, 1, 0, 0) | (4, 3, 1, 1, 1) | (1, 1, 1, 1, 0) |
| 4 | 4 | (0, 4, 2, 1, 0) | (0, 4, 2, 1, 0) | (2, 3, 1, 1, 1) | (2, 3, 1, 1, 1) |
| 4 | 8 | (1, 3, 2, 1, 0) | (0, 6, 2, 1, 1) | (2, 3, 1, 1, 1) | (2, 6, 2, 2, 1) |
| 8 | 2 | (0, 8, 3, 1, 1) | (2, 2, 1, 0, 0) | (4, 6, 2, 2, 1) | (2, 1, 1, 1, 0) |
| 8 | 4 | (0, 6, 2, 1, 1) | (0, 3, 2, 1, 0) | (4, 6, 2, 2, 1) | (2, 3, 1, 1, 1) |
| 8 | 8 | (0, 4, 2, 1, 1) | (0, 4, 2, 1, 1) | (4, 4, 2, 2, 1) | (4, 4, 2, 2, 1) |

FIG. 13

| $N_1$ | $N_2$ | COMBINATION OF EPDCCH CANDIDATE NUMBERS (AL1, AL2, AL4, AL8, AL16) | | | |
|---|---|---|---|---|---|
| | | WHEN FIRST EPDCCH SET CORRESPONDS TO FIRST CONDITIONS | | WHEN FIRST EPDCCH SET CORRESPONDS TO SECOND CONDITIONS | |
| | | FIRST EPDCCH SET | SECOND EPDCCH SET | FIRST EPDCCH SET | SECOND EPDCCH SET |
| 2 | 2 | (0, 2, 1, 0, 0) | (2, 2, 1, 0, 0) | (2, 2, 1, 1, 0) | (0, 2, 1, 0, 0) |
| 2 | 4 | (0, 2, 1, 0, 0) | (0, 4, 2, 1, 0) | (2, 2, 1, 1, 0) | (2, 4, 2, 1, 0) |
| 2 | 8 | (0, 2, 1, 0, 0) | (0, 8, 2, 1, 1) | (2, 1, 1, 1, 0) | (2, 8, 3, 1, 1) |
| 4 | 2 | (0, 4, 2, 1, 0) | (4, 2, 1, 0, 0) | (4, 3, 1, 1, 1) | (2, 2, 1, 0, 0) |
| 4 | 4 | (0, 4, 2, 1, 0) | (0, 4, 2, 1, 0) | (2, 3, 1, 1, 1) | (0, 4, 2, 1, 0) |
| 4 | 8 | (0, 3, 2, 1, 0) | (0, 6, 2, 1, 1) | (2, 3, 1, 1, 1) | (0, 6, 2, 1, 1) |
| 8 | 2 | (0, 8, 3, 1, 1) | (2, 2, 1, 0, 0) | (4, 6, 2, 2, 1) | (1, 2, 1, 0, 0) |
| 8 | 4 | (0, 6, 2, 1, 1) | (0, 3, 2, 1, 0) | (4, 6, 2, 2, 1) | (0, 3, 2, 1, 0) |
| 8 | 8 | (0, 4, 2, 1, 1) | (0, 4, 2, 1, 1) | (4, 4, 2, 2, 1) | (0, 4, 2, 1, 1) |

MOBILE STATION APPARATUS, BASE STATION APPARATUS, COMMUNICATION METHOD AND INTEGRATED CIRCUIT

TECHNICAL FIELD

The present invention relates to a base station, a terminal, a communication system, a communication method and an integrated circuit.

BACKGROUND ART

In wireless communication systems such as Wideband Code Division Multiple Access (WCDMA; registered trademark), Long Term Evolution (LTE), and LTE-Advanced (LTE-A) based on Third Generation Partnership Project (3GPP), and a wireless LAN or Worldwide Interoperability for Microwave Access (WiMAX) based on the Institute of Electrical and Electronics Engineers (IEEE), a base station (a cell, a transmission station, a transmission apparatus, or eNodeB) and a terminal (a mobile terminal, a reception station, a mobile station, a reception apparatus, or User Equipment (UE)) include a plurality of transmission and reception antennas, respectively, and data signals are spatially multiplexed using a Multi Input Multi Output (MIMO) technology so as to achieve high-speed data communication.

In such wireless communication systems, in a case where the base station transmits downlink data (a transport block for a downlink shared channel (DL-SCH)) to the terminal, the base station multiplexes and transmits demodulation reference signals (also be referred to as DMRS) that are signals known between the base station and the terminal. Here, the demodulation reference signals are also referred to as user equipment-specific reference signals (UE-specific RS; terminal-specific RS).

For example, the DMRS is multiplexed with the downlink data before a precoding process is applied. Therefore, the terminal can measure an equalization channel including the applied precoding process and a channel state using the DMRS. That is, the terminal can demodulate the downlink data even when the base station does not notify the terminal of the applied precoding process.

Here, the downlink data is mapped to a physical downlink shared channel (PDSCH). That is, the reference signal is used for demodulation of the PDSCH. Further, for example, the reference signal is transmitted only in a resource block (physical resource block; also referred to as resources) to which the corresponding PDSCH is mapped.

Here, a wireless communication system using a heterogeneous network deployment (HetNet) based on, for example, a macro base station having a wide coverage and an Remote Radio Head (RRH) having a narrower coverage than the macro base station has been studied. FIG. 9 is a schematic diagram of the wireless communication system using the heterogeneous network deployment. As illustrated in FIG. 13, for example, the heterogeneous network includes a macro base station 901, an RRH 902, and an RRH 903.

In FIG. 14, a macro base station 1401 builds coverage 1405, and an RRH 1402 and an RRH 1403 build coverage 1406 and coverage 1407, respectively. Further, the macro base station 1401 is connected to the RRH 1402 via a line 1408 and connected to the RRH 1403 via a line 1409. Accordingly, the macro base station 1401 can transmit or receive a data signal or a control signal (control information) to or from the RRH 1402 and the RRH 1403. Here, for example, a wired line such as an optical fiber or a wireless line using a relay technology is used for the line 1408 and the line 1409. In this case, some or all of the macro base station 1401, the RRH 1402, and the RRH 1403 use the same resources, and thus, it is possible to improve general frequency use efficiency (transmission capacity) in an area of the coverage 1405.

Further, in a case where a terminal 1404 is located within the coverage 1406, the terminal 1404 can perform single-cell communication with the RRH 1402. Further, in a case where the terminal 1404 is located near an edge (cell edge) of the coverage 1406, measures to solve interference of the same channel from the macro base station 1401 are necessary. Here, a method of reducing or suppressing the interference with the terminal 1404 in a cell edge region by performing cooperative communication between base stations to cooperate with each other between adjacent base stations has been examined as a multi-cell communication (cooperative communication) between the macro base station 1401 and the RRH 1402. For example, a Cooperative Multipoint (CoMP) transmission system has been studied as a scheme for reducing or suppressing interference due to inter-base-station cooperative communication (NPL 1).

CITATION LIST

Non Patent Literature

NPL 1: 3rd Generation Partnership Project; Technical Specification Group Radio Access Network; Coordinated multi-point operation for LTE physical layer aspects (Release 11), September, 2011, 3GPP TR 36.819 V11.0.0 (2011-09).

SUMMARY OF INVENTION

Disclosure of the Invention

Problems to be Solved by the Invention

However, in the heterogeneous network deployment, a CoMP transmission scheme, and/or the like, in a case where a conventional method is used as a method for notification of control information from the base station to the terminal, a problem with a capacity in a notification region for the control information is generated. As a result, since the base station is unable to efficiently notify of the control information for the terminal, transmission efficiency in communication between the base station and the terminal is not improved.

The present invention provides a base station, a terminal, a communication system, a communication method, and an integrated circuit in which the base station efficiently notifies of control information for the terminal in a communication system in which the base station and the terminal perform communication.

Means for Solving the Problems (1) In order to solve the above problems, the present invention provides the following measures. A mobile station apparatus according to an aspect of the present invention is a mobile station apparatus that communicates with a base station apparatus, the mobile station apparatus including: an EPDCCH processing unit configured to monitor EPDCCH candidates included in each of a first EPDCCH set and a second EPDCCH set that are configured by RRC signaling, in which the EPDCCH candidates are determined at least based on a number of resource elements satisfying a predetermined criteria in one of physical resource block pairs that are configured for EPDCCH transmission in the first EPDCCH set.

(2) Further, in the mobile station apparatus according to an aspect of the present invention, in a case where the number of resource elements satisfying the predetermined criteria is smaller than a predetermined number, the EPDCCH candidates are determined based on a first EPDCCH candidate number.

(3) Further, in the mobile station apparatus according to an aspect of the present invention, in a case where the number of resource elements satisfying the predetermined criteria is equal to or greater than the predetermined number, the EPDCCH candidates are determined based on a second EPDCCH candidate number.

(4) Further, in the mobile station apparatus according to an aspect of the present invention, the predetermined number is 104.

(5) Further, in the mobile station apparatus according to an aspect of the present invention, the resource element satisfying the predetermined criteria is a resource element at least satisfying that an OFDM symbol index of a resource element in a first slot within one subframe in the physical resource block pair is equal to or greater than a value set for the first EPDCCH set.

(6) Further, in the mobile station apparatus according to an aspect of the present invention, the resource element satisfying the predetermined criteria is a resource in an enhanced resource element group in the physical resource block pair, and is a resource element at least satisfying that the resource element is assumed not to be used for a cell-specific reference signal or a CSI reference signal.

(7) Further, in the mobile station apparatus according to an aspect of the present invention, the EPDCCH candidates are further determined based on a type of a cyclic prefix, a type of a subframe, and a DCI format to be monitored.

(8) Further, in the mobile station apparatus according to an aspect of the present invention, the first EPDCCH candidate number is defined for a combination of first aggregation levels, and the second EPDCCH candidate number is defined for a combination of second aggregation levels.

(9) Further, in the mobile station apparatus according to an aspect of the present invention, the combination of the first aggregation levels does not include aggregation level 1, and the combination of the second aggregation levels includes aggregation level 1.

(10) A base station apparatus according to an aspect of the present invention is a base station apparatus that communicates with a mobile station apparatus, the base station apparatus including: an EPDCCH generation unit configured to map an EPDCCH to any one of EPDCCH candidates included in each of a first EPDCCH set and a second EPDCCH set that are configured by RRC signaling, in which the EPDCCH candidates are determined at least based on a number of resource elements satisfying a predetermined criteria in one of physical resource block pairs that are configured for EPDCCH transmission in the first EPDCCH set.

(11) Further, in the base station apparatus according to an aspect of the present invention, in a case where the number of resource elements satisfying the predetermined criteria is smaller than a predetermined number, the EPDCCH candidates are determined based on a first EPDCCH candidate number.

(12) Further, in the base station apparatus according to an aspect of the present invention, in a case where the number of resource elements satisfying the predetermined criteria is equal to or greater than the predetermined number, the EPDCCH candidates are determined based on a second EPDCCH candidate number.

(13) Further, in the base station apparatus according to an aspect of the present invention, the predetermined number is 104.

(14) Further, in the base station apparatus according to an aspect of the present invention, the resource element satisfying the predetermined criteria is a resource element at least satisfying that an OFDM symbol index of a resource element in a first slot within one subframe in the physical resource block pair is equal to or greater than a value set for the first EPDCCH set.

(15) Further, in the base station apparatus according to an aspect of the present invention, the resource element satisfying the predetermined criteria is a resource in an enhanced resource element group in the physical resource block pair, and is a resource element at least satisfying that the resource element is assumed not to be used for a cell-specific reference signal or a CSI reference signal.

(16) Further, in the base station apparatus according to an aspect of the present invention, the EPDCCH candidates are further determined based on a type of a cyclic prefix, a type of a subframe, and a DCI format to be monitored.

(17) Further, in the base station apparatus according to an aspect of the present invention, the first EPDCCH candidate number is defined for a combination of first aggregation levels, and the second EPDCCH candidate number is defined for a combination of second aggregation levels.

(18) Further, in the base station apparatus according to an aspect of the present invention, the combination of the first aggregation levels does not include aggregation level 1, and the combination of the second aggregation levels includes aggregation level 1.

(19) A communication method according to an aspect of the present invention is a communication method in a mobile station apparatus that communicates with a base station apparatus, the communication method including: monitoring EPDCCH candidates included in each of a first EPDCCH set and a second EPDCCH set that are configured by RRC signaling, in which the EPDCCH candidates are determined at least based on a number of resource elements satisfying a predetermined criteria in one of physical resource block pairs that are configured for EPDCCH transmission in the first EPDCCH set.

(20) A communication method according to an aspect of the present invention is a communication method in a base station apparatus that communicates with a mobile station apparatus, the communication method including: mapping an EPDCCH to any one of EPDCCH candidates included in each of a first EPDCCH set and a second EPDCCH set that are configured by RRC signaling, in which the EPDCCH candidates are determined at least based on a number of resource elements satisfying a predetermined criteria in one of physical resource block pairs that are configured for EPDCCH transmission in the first EPDCCH set.

(21) An integrated circuit according to an aspect of the present invention is an integrated circuit mounted on a mobile station apparatus that communicates with a base station apparatus, in which the mobile station apparatus is caused to perform a series of functions including a function of monitoring EPDCCH candidates included in each of a first EPDCCH set and a second EPDCCH set that are configured by RRC signaling, and the EPDCCH candidates are determined at least based on a number of resource elements satisfying a predetermined criteria in one of physical resource block pairs that are configured for EPDCCH transmission in the first EPDCCH set.

(22) An integrated circuit according to an aspect of the present invention is an integrated circuit mounted on a base station apparatus that communicates with a mobile station apparatus, in which the base station apparatus is caused to perform a series of functions including a function of mapping an EPDCCH to any one of EPDCCH candidates included in each of a first EPDCCH set and a second EPDCCH set that are configured by RRC signaling, and the EPDCCH candidates are determined at least based on a number of resource elements satisfying a predetermined criteria in one of physical resource block pairs that are configured for EPDCCH transmission in the first EPDCCH set.

Effects of the Invention

According to the present invention, in a wireless communication system in which a base station and a terminal perform communication, the base station can efficiently notify of the control information for the terminal.

BRIEF DESCRIPTION OF THE DRAWINGS

FIG. 6 is a diagram illustrating a combination of resource elements to an EREG number in one RB pair.

FIG. 7 is a diagram illustrating an example of a combination of the EPDCCH candidate numbers in a case where one EPDCCH set is configured.

FIG. 8 is a diagram illustrating an example of a combination of the EPDCCH candidate numbers in a case where two EPDCCH sets are configured.

FIG. 9 is a diagram illustrating an example of a combination of the EPDCCH candidate numbers in a case where two EPDCCH sets are configured.

FIG. 10 is a diagram illustrating an example of a combination of the EPDCCH candidate numbers in a case where two EPDCCH sets are configured.

FIG. 11 is a diagram illustrating an example of a combination of the EPDCCH candidate numbers in a case where two EPDCCH sets are configured.

FIG. 12 is a diagram illustrating an example of a combination of the EPDCCH candidate numbers in a case where two EPDCCH sets are configured.

FIG. 13 is a diagram illustrating an example of a combination of the EPDCCH candidate numbers in a case where two EPDCCH sets are configured.

MODE FOR CARRYING OUT THE INVENTION

Figure 1:
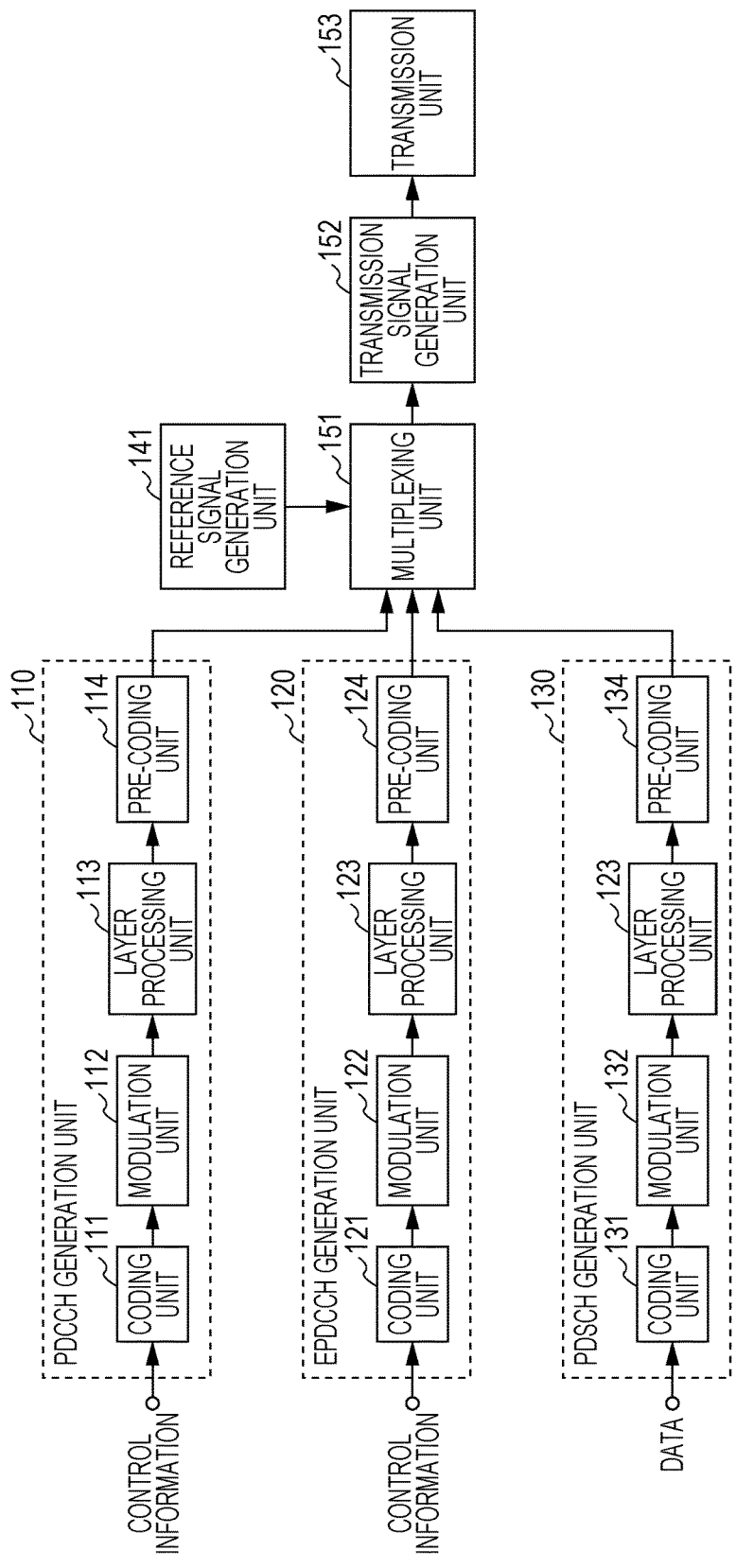
FIG. 1 is a schematic block diagram illustrating a configuration of a base station according to an embodiment of the present invention.

A technology to be described herein can be used in communication systems such as a code division multiple access (CDMA) system, a time division multiple access (TDMA) system, a frequency division multiple access (FDMA) system, an orthogonal FDMA (OFDMA) system, a single-carrier FDMA (SC-FDMA) system, an interleaved division multiple access (IDMA), and other systems. The terms "system" and "network" can often be interchangeably used. A third generation partnership project (3GPP) has standardized a communication system referred to as Long Term Evolution (LTE) and LTE-Advanced (LTE-A). LTE is a UMTS using E-UTRA in which OFDMA is used on a downlink and SC-FDMA is used on an uplink. LTE-A is a system, a wireless technology, or a standard obtained by enhancing the LTE. While a case in which a technology described below is used in LTE and/or LTE-A will be described, the technology can also be applied to other communication systems. Further, terms used in an LTE standard, terms used an LTE-A standard, and terms used in 3GPP are used in the following description.

First Embodiment

Hereinafter, an embodiment of the present invention will be described. A communication system in the present embodiment includes a base station and a terminal. Here, the base station can be a transmission apparatus, a cell, a transmission point, a transmission antenna group, a transmission antenna port group, a component carrier, or an eNodeB. The base station includes a macro cell, a pico cell, a femto cell, a small cell, a Remote Radio Head (RRH), and a distribution antenna. The terminal can be a terminal apparatus, a mobile terminal, a reception point, a reception terminal, a reception device, a reception antenna group, a reception antenna port group, or User Equipment (UE). Further, the terminal can identify a base station (transmission point) based on a cell-specific parameter or a parameter specific to the terminal. For example, the terminal can identify the base station (transmission point) based on a cell ID that is an identifier specific to the cell, a parameter (for example, a virtual cell ID) set in the terminal via signaling of a higher layer, or the like.

In the communication system of the present invention, a base station 100 and a terminal 200 transmit and/or receive control information and/or data via the downlink and/or the uplink in order to perform data communication. The base station 100 transmits a physical downlink control channel (PDCCH; first control channel), an enhanced PDCCH (EPDCCH; enhanced physical downlink control channel or a second control channel), and/or a physical downlink shared channel (PDSCH) to the terminal 200 via the downlink. Control information is transmitted via the PDCCH and/or the EPDCCH. Data is transmitted via the PDSCH. Further, control information (RRC signaling) of the higher layer can be transmitted via the PDSCH. That is, the data may be configured to include the control information of the higher layer. On the other hand, the terminal 200 transmits a physical uplink control channel (PUCCH) and/or a physical uplink shared channel (PUSCH) to the base station 100 via the uplink. The control information is transmitted via the PUCCH and/or PUSCH. The data is transmitted via the PUSCH. Here, the PDCCH, the EPDCCH, the PDSCH, the PUCCH, and the PUSCH are types of a physical channel, and is a channel defined on the physical frame. Further, while a case in which the base station 100 and the terminal 200 perform data communication will be described in the following description, there may be a plurality of the base stations and/or a plurality of terminals.

<Transceiver Configuration>

FIG. 1 is a schematic block diagram illustrating a configuration of a base station according to the embodiment of the present invention. In FIG. 1, the base station 100 includes a PDCCH generation unit 110, an EPDCCH generation unit 120, a PDSCH 130, a reference signal generation unit 141, a multiplexing unit 151, a transmission signal generation unit 152, and a transmission unit 153. The PDCCH generation unit 110 includes a coding unit 111, a modulation unit 112, a layer processing unit 113, and a precoding unit 114. The EPDCCH generation unit 120 includes a coding unit 121, a modulation unit 122, a layer processing unit 123, and a precoding unit 124. The PDSCH generation unit 130 includes a coding unit 131, a modulation unit 132, a layer processing unit 133, and a precoding unit 134. Although not shown, the base station 100 includes a control unit, and the control unit can control various processes in the base station 100.

The control information for the terminal 200 (downlink control information (DCI)) is input to the PDCCH generation unit 110 and/or the EPDCCH generation unit 120. Further, data for the terminal 200 (transport block or a codeword) is input to the PDSCH generation unit 130. Here, the data can be a unit of error correction coding. Further, the data may be a unit of retransmission control such as a Hybrid Automatic Repeat request (HARQ). Further, the base station 100 may transmit a plurality of pieces of control information and/or data to the terminal 200.

The PDCCH generation unit 110 generates a PDCCH from the input control information. The coding unit 111 performs error detection coding using a cyclic redundancy check (CRC), error correction coding using an error correction code such as a convolutional code, and scramble coding using a pseudo-noise sequence on the input control information. Further, the coding unit 111 performs scrambling on a parity bit (redundancy bit) in CRC using an identifier specific to the terminal 200 (UE-ID or Radio Network Temporary ID (RNTI)). Further, the coding unit 111 can control a coding rate using a predetermined method. The modulation unit 112 performs modulation on a signal generated by the coding unit 111 using a modulation scheme such as Quadrature Phase Shift Keying (QPSK). The layer processing unit 113 performs layer processing such as layer mapping on a signal generated by the modulation unit 112. The layer mapping in the layer processing unit 113 includes performing mapping (assignment) of an input signal to each of one or more layers. The precoding unit 114 performs a precoding process on a signal generated by the layer processing unit 113 using a predetermined method to generate a signal for each antenna port. For example, the precoding unit 114 performs a precoding process by which frequency diversity effects are obtained. In the PDCCH generation unit 110, the number of layers of the PDCCH and the number of antennas ports can be the same number. The PDCCH can be transmitted using some or all of the antenna ports 0 to 3.

The EPDCCH generation unit 120 generates an EPDCCH from the input control information. The coding unit 121 performs error detection coding using a Cyclic Redundancy Check (CRC), error correction coding using an error correction code such as a convolutional code, and scramble coding using a pseudo-noise sequence on the input control information. Further, the coding unit 121 performs scrambling on a parity bit in CRC using an identifier specific to the terminal 200. Further, the coding unit 121 can control a coding rate using a predetermined method. The modulation unit 122 performs modulation on a signal generated by the coding unit 121 using a modulation scheme such as QPSK.

The layer processing unit 123 performs layer processing such as layer mapping on a signal generated by the modulation unit 122. The layer mapping in the layer processing unit 123 includes performing mapping (allocation) of an input signal to each of one or more layers. The precoding unit 124 performs a precoding process on a signal generated by the layer processing unit 123 using a predetermined method to generate a signal for each antenna port. For example, the precoding unit 124 performs a precoding process by which frequency diversity effects and/or frequency scheduling effects are obtained. In the EPDCCH generation unit 120, the signal of each layer of the EPDCCH and the signal for each antenna port can be the same. The EPDCCH can be transmitted using some or all of antenna ports 107 to 110. Further, the EPDCCH generation unit 120 can map the EPDCCH generated by the precoding unit 124 to a predetermined resource element.

Further, the PDSCH generation unit 130 generates a PDSCH from the input data. Further, the data is input from, for example, the higher layer. The coding unit 131 performs scramble coding using a pseudo-noise sequence and error correction coding using an error correction code such as turbo code on the input data. Further, the coding unit 131 can control the coding rate using a predetermined method. The modulation unit 132 performs modulation on a signal generated by the coding unit 131 using a modulation scheme such as QPSK or Quadrature Amplitude Modulation (QAM). The layer processing unit 133 performs layer processing such as layer mapping on a signal generated by the modulation unit 132. The layer mapping in the layer processing unit 133 includes performing mapping (allocation) of an input signal to each of one or more layers. The number of layers for the PDSCH is determined based on a MIMO multiplexing number (rank number) for the terminal 200. The precoding unit 134 performs a precoding process on a signal generated by the layer processing unit 133 using a predetermined method, to generate a signal for each antenna port. For example, the precoding unit 134 performs the precoding process by which frequency scheduling effects are obtained. In the PDSCH generation unit 130, the signal of each layer of the PDSCH and the signal for each antenna port can be the same. The PDSCH can be transmitted using some or all of antenna ports 7 to 14.

The reference signal generation unit 141 generates a reference signal which is a signal (sequence) known to the base station 100 and the terminal 200. The reference signal can be associated with each antenna port. The reference signal includes a cell-specific reference signal (CRS; Cell-specific RS), a terminal-specific reference signal (UERS; UE-specific RS), a reference signal for EPDCCH demodulation (DM-RS), and a reference signal for channel state measurement (CSI-RS; Channel State Information-RS). The cell-specific reference signal is associated with the antenna ports 0 to 3, and can be used for the terminal 200 to demodulate the PDCCH and the cell-specific signal. The terminal-specific reference signal is associated with antenna ports 7 to 14, and can be used for the terminal 200 to demodulate the PDSCH. The reference signal for EPDCCH demodulation is associated with antenna ports 107 to 110, and can be used for the terminal 200 to demodulate the EPDCCH. The reference signal for channel state measurement is associated with antenna ports 15 to 22, and can be used for the terminal 200 to measure a channel state of the downlink of which the base station 100 is to be notified.

Here, the antenna port means a logical antenna used for signal processing, and one antenna port may include a plurality of physical antennas. The plurality of physical antennas constituting the same antenna port transmit the same signal. In the same antenna port, the plurality of physical antennas may apply delay diversity or Cyclic Delay Diversity (CDD).

The reference signal generation unit 141 performs the precoding process on each reference signal using a predetermined method to generate a signal for each antenna port. Here, the reference signal at each antenna port is subjected to the same precoding process as that for the channel associated with the antenna port. That is, the cell-specific reference signal is subjected to the same precoding process as that of the precoding unit 114. The reference signal for EPDCCH demodulation is subjected to the same precoding process as that of the precoding unit 124. The terminal-specific reference signal is subjected to the same precoding process as that of the precoding unit 134. The reference signal for channel state measurement may not be subjected to the precoding process.

Here, various methods may be used in the precoding process. The precoding process by which the frequency diversity effect is obtained may be performed using, for example, Space Frequency Block Coding (SFBC), Space Time Block Coding (STBC), Frequency Switched Transmit Diversity (FSTD), and/or Cyclic Delay Diversity (CDD). The precoding process by which a frequency scheduling effect is obtained may be performed by multiplying a predetermined precoding matrix. It is preferable for the precoding process by which a frequency scheduling effect is obtained to include performing, for example, phase rotation and/or amplitude control in consideration of the channel state so that the terminal 200 can perform efficient reception.

The multiplexing unit 151 multiplexes the PDCCH generated by the PDCCH generation unit 110, the EPDCCH generated by the EPDCCH generation unit 120, the PDSCH generated by the PDSCH generation unit 130, and/or the reference signal generated by the reference signal generation unit 141, and maps a result to the resource elements. Here, the resource element is a minimum unit for mapping a signal including one OFDM symbol and one subcarrier. The signal and/or the channel multiplexed by the multiplexing unit 151 is mapped to a different resource element and/or antenna port, respectively, and thus, may be orthogonal or quasi-orthogonal to each other.

Further, the PDCCH generation unit 110, the EPDCCH generation unit 120, the PDSCH generation unit 130, and the reference signal generation unit 141 may map the PDCCH, the EPDCCH, the PDSCH, and the reference signal to predetermined resource elements, respectively, and the multiplexing unit 151 multiplexes them.

The transmission signal generation unit 152 generates a transmission signal from the signal multiplexed by the multiplexing unit 151. The transmission signal generation unit 152 performs frequency-time conversion on the signal multiplexed by the multiplexing unit 151 using Inverse Fast Fourier Transform (IFFT), and adds a cyclic prefix (guard interval) having a predetermined cyclic prefix (CP) length. Further, a plurality of types of CP lengths can be defined. For example, in a case where two types of CP lengths are defined, the CP having a short CP length is also referred to as a normal CP (first CP), and the CP having a long CP length is also referred to as enhanced CP (second CP).

The transmission signal generation unit 152 further performs digital-analog conversion, frequency conversion to a radio frequency band, or the like, to generate the transmission signal. The transmission unit (transmission antenna) 153 transmits the transmission signal generated by the transmission signal generation unit 152 from one or a plurality of antenna ports (transmission antenna port).

Figure 2:
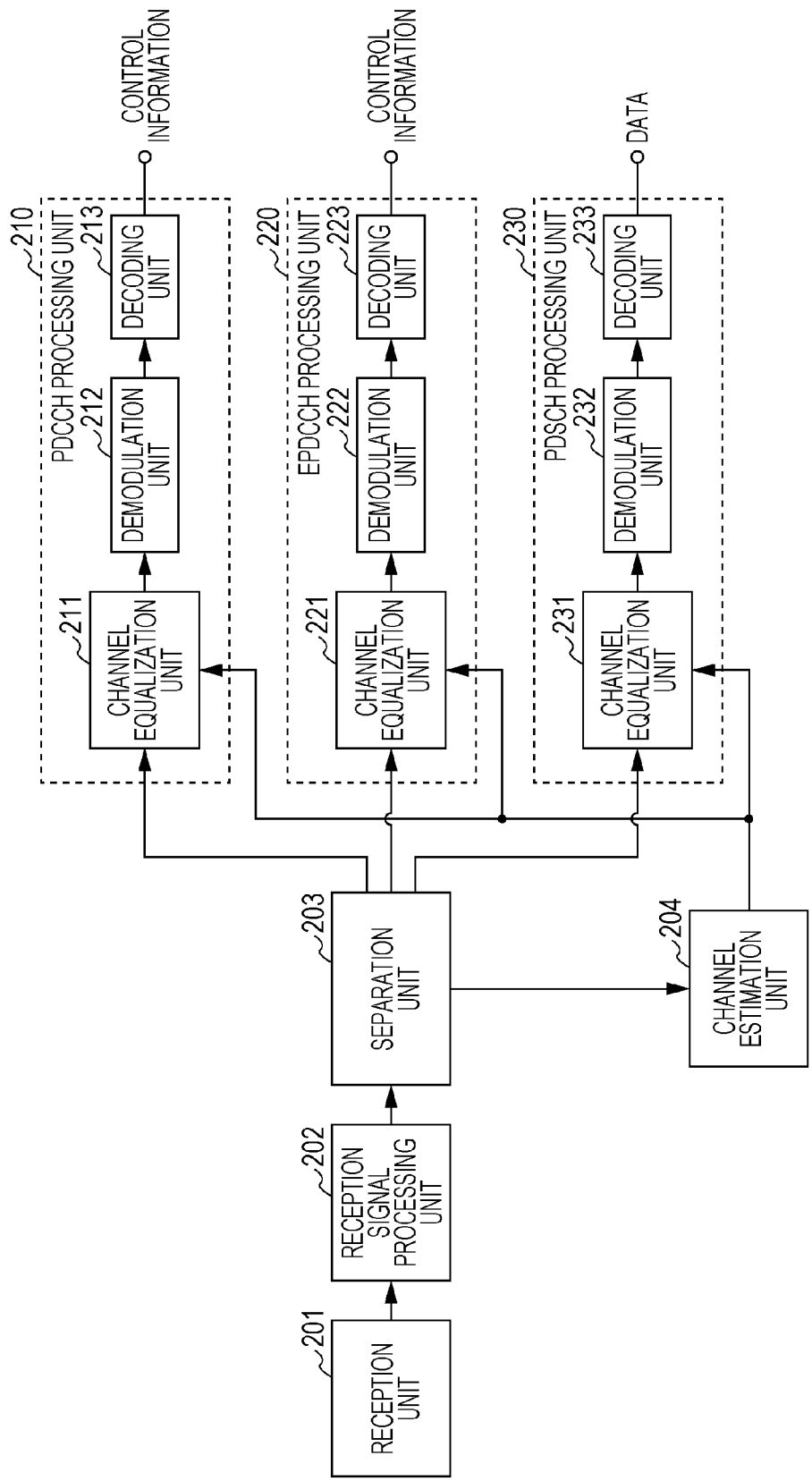
FIG. 2 is a schematic block diagram illustrating a configuration of a terminal according to the embodiment of the present invention.

FIG. 2 is a schematic block diagram illustrating a configuration of the terminal according to the embodiment of the present invention. In FIG. 2, the terminal 200 includes a reception unit 201, a reception signal processing unit 202, a separation unit 203, a channel estimation unit 204, a PDCCH processing unit 210, an EPDCCH processing unit 220, and a PDSCH processing unit 230. The PDCCH processing unit 210 includes a channel equalization unit 211, a demodulation unit 212, and a decoding unit 213. The EPDCCH processing unit 220 includes a channel equalization unit 221, a demodulation unit 222, and a decoding unit 223. The PDSCH processing unit 230 includes a channel equalization unit 231, a demodulation unit 232, and a decoding unit 233. Although not shown, the terminal 200 includes a controller, and the controller can control various processes in the terminal 200.

The reception unit (reception antenna) 201 receives the signal transmitted by the base station 100 using one or a plurality of reception antenna ports. The reception signal processing unit 202 performs time-frequency conversion on the signal received by the reception unit 201 using frequency conversion from a radio frequency to a baseband signal, analog-digital conversion, removal of the added cyclic prefix, Fast Fourier Transform (FFT), or the like.

The separation unit 203 separates (demaps) the signal multiplexed (mapped) in the multiplexing unit 151 of the base station 100. Specifically, the separation unit 203 separates the PDCCH, the EPDCCH, the PDSCH, and/or the reference signal using a predetermined method. The PDCCH is input to the PDCCH processing unit 210. The EPDCCH is input to the EPDCCH processing unit 220. The PDSCH is input to the PDSCH processing unit 230. The reference signal is input to the channel estimation unit 204. For example, in a case where resources to which a channel or a signal is likely to be mapped are defined in advance, the separation unit 203 may separate the channel or the signal, or a candidate of the channel or the signal from the defined resources. Further, for example, in a case where resources to which a channel or a signal is likely to be mapped are notified of and configured, the separation unit 203 may separate the channel or the signal, or a candidate of the channel or the signal from the configured resources. Further, in a case where information indicating resources to which the PDSCH is mapped is included in the control information notified of via the PDCCH and/or the EPDCCH, the terminal 200 may detect the control information, and then, the separation unit 203 may separate the PDSCH based on the control information.

The channel estimation unit 204 performs channel estimation for the PDCCH, the EPDCCH, and/or the PDSCH using the reference signal. The channel estimation for the PDCCH is performed using a cell-specific reference signal. The channel estimation for the EPDCCH is performed using a reference signal for EPDCCH demodulation. The channel estimation for the PDSCH is performed using a terminal-specific reference signal. The channel estimation unit 204 estimates variations in amplitude and phase (a frequency response and a transfer function) in each resource element of each transmission antenna port with respect to each reception antenna port using the reference signal, and obtains a channel estimation value. The channel estimation unit 204 outputs the channel estimation value to the PDCCH processing unit 210, the EPDCCH processing unit 220, and/or the PDSCH processing unit 230.

The PDCCH processing unit 210 searches for a PDCCH candidate destined for the terminal 200 from a PDCCH region, detects the PDCCH destined for the terminal 200, and identifies the control information destined for the terminal 200. The channel equalization unit 211 performs channel equalization (channel compensation) for the PDCCH candidate using the PDCCH candidate input from the separation unit 203 and the channel estimation value input from the channel estimation unit 204. The demodulation unit 212 performs demodulation for a predetermined modulation scheme on the signal subjected to the channel equalization by the channel equalization unit 211. The decoding unit 213 performs scramble decoding for predetermined scrambling coding using a pseudo-noise sequence, error correction decoding for predetermined error correction coding, and error detection decoding for predetermined error detection coding on the signal demodulated by the decoding unit 212. Here, the CRC parity bit obtained by the error correction decoding is subjected to scrambling decoding using the identifier specific to the terminal 200, and to error detection decoding. Therefore, if no error is detected from the PDCCH through error detection decoding, the PDCCH processing unit 210 can detect the PDCCH as a PDCCH destined for the terminal 200. The PDCCH processing unit 210 identifies the control information from the detected PDCCH. The control information is used for various controls of the terminal 200. Further, the PDCCH processing unit 210 performs the process on all the PDCCH candidates.

The EPDCCH processing unit 220 searches for an EPDCCH candidate destined for the terminal 200 from an EPDCCH region (EPDCCH set), detects the EPDCCH destined for the terminal 200, and identifies the control information destined for the terminal 200. The channel equalization unit 221 performs channel equalization (channel compensation) for the EPDCCH candidate using the EPDCCH candidate input from the separation unit 203 and the channel estimation value input from the channel estimation unit 204. The demodulation unit 222 performs demodulation for a predetermined modulation scheme on the signal subjected to the channel equalization by the channel equalization unit 221. The decoding unit 223 performs scramble decoding for predetermined scrambling coding using a pseudo-noise sequence, error correction decoding for predetermined error correction coding, and error detection decoding for predetermined error detection coding on the signal demodulated by the decoding unit 222. Here, the CRC parity bit obtained by the error correction decoding is subjected to scrambling decoding using the identifier specific to the terminal 200, and to error detection decoding. Therefore, if no error is detected from the EPDCCH through error detection decoding, the EPDCCH processing unit 220 can detect the EPDCCH as an EPDCCH destined for the terminal 200. The EPDCCH processing unit 220 identifies the control information from the detected EPDCCH. The control information is used for various controls of the terminal 200. Further, the EPDCCH processing unit 220 performs the process on all the EPDCCH candidates.

<Control Information>

The PDSCH processing unit 230 may process the PDSCH destined for the terminal 200 to detect the data destined for the terminal 200. The process performed by the PDSCH processing unit 230 may be performed based on the control information detected in the same or previous subframe. Further, the process to be performed by the PDSCH processing unit 230 may be performed based on predefined control information. Further, the process to be performed by the PDSCH processing unit 230 may be performed based on control information notified of via a higher layer. The channel equalization unit 231 performs channel equalization (channel compensation) for the PDSCH using the PDSCH input from the separation unit 203 and the channel estimation value input from the channel estimation unit 204. The demodulation unit 232 performs demodulation for a predetermined modulation scheme on the signal subjected to the channel equalization by the channel equalization unit 231. The decoding unit 233 performs scramble decoding for predetermined scrambling coding using a pseudo-noise sequence, and error correction decoding for predetermined error correction coding on the signal demodulated by the decoding unit 232. The PDSCH processing unit 230 detects the data from the processed PDSCH and output the data to the higher layer or the like. Further, the PDSCH processing unit 230 can perform the process on a plurality of PDSCHs.

Here, configuration of the EPDCCH region is performed through the control information (for example, Radio Resource Control (RRC) signaling) of the higher layer of which the base station 100 notifies the terminal 200. For example, the configuration of the EPDCCH region is terminal-specific configuration information of the EPDCCH, which is control information for configuring the EPDCCH and is configuration information specific to the terminal 200. Further, the EPDCCH region is also referred to as an EPDCCH set. Further, in the terminal, a plurality of EPDCCH regions can be configured. For example, in the terminal, one or two EPDCCH regions may be configured. Further, in a case where two EPDCCH regions are configured, the respective EPDCCH regions are also referred to as a first EPDCCH region (first EPDCCH set) and a second EPDCCH region (second EPDCCH set). Details of the configuration of the EPDCCH will be described below. Further, in the following description, the PDCCH and the EPDCCH are simply also referred to as a control channel.

For example, in a case where the terminal-specific configuration information of the EPDCCH is notified of and the EPDCCH region is configured by the base station 100, the EPDCCH processing unit 220 searches for a control channel destined for the terminal 200 mapped to the EPDCCH region. In this case, the PDCCH processing unit 210 may also search for the PDCCH of PDCCH region. For example, the PDCCH processing unit 210 may further search for a cell-specific search space in the PDCCH region. Further, in a case where the terminal-specific configuration information of the EPDCCH is not notified of and the EPDCCH region is not configured by the base station 100, the PDCCH processing unit 210 searches for the PDCCH destined for the terminal 200 mapped to the PDCCH region.

Here, in a case where the EPDCCH processing unit 220 searches for the EPDCCH destined for the terminal 200 mapped to the EPDCCH region, the EPDCCH processing unit 220 uses the terminal-specific reference signal so as to demodulate the possible EPDCCH. Further, in a case where the PDCCH processing unit 210 searches for the PDCCH destined for the terminal 200 mapped to the PDCCH region, the PDCCH processing unit 210 uses the cell-specific reference signal so as to demodulate the PDCCH.

Specifically, the PDCCH processing unit 210 and/or the EPDCCH processing unit 220 sequentially searches for all or some of the control channel candidates obtained based on a type of control information (DCI; Downlink Control Information), a position of resources to be mapped, a size of the resources to be mapped, or the like by performing a demodulation and decoding process. The PDCCH processing unit 210 and the EPDCCH processing unit 220 uses an error detection code (for example, Cyclic Redundancy Check (CRC) code) added to the control information as a method of determining whether the control information is destined for the terminal 200. Further, such a search method is also referred to as blind decoding.

Further, in the terminal 200, a number (a number of candidates of the PDCCH and/or the EPDCCH) for performing blind decoding in the PDCCH processing unit 210 and/or the EPDCCH processing unit 220 can be set based on the control information notified of using PDCCH signaling, EPDCCH signaling, and/or RRC signaling. The terminal 200 can set or recognize the number (the number of candidates of the PDCCH and/or the EPDCCH) for performing blind decoding in the PDCCH processing unit 210 and/or the EPDCCH processing unit 220 using a predefined method.

Further, in a case where the PDCCH processing unit 210 and/or the EPDCCH processing unit 220 detects the control channel destined for the terminal 200, the PDCCH processing unit 210 and/or the EPDCCH processing unit 220 identifies the control information mapped to the detected control channel. The control information is shared in the entire terminal 200 (also including a higher layer) and used for various controls in the terminal 200, such as a reception process for a downlink data channel (PDSCH), a transmission process for an uplink data channel (PUSCH) or an uplink control channel (PUCCH), and transmission power control in the uplink.

In the PDCCH processing unit 210 and/or the EPDCCH processing unit 220, in a case where the control information including allocation information of the downlink data channel has been mapped to the detected control channel, the separation unit 203 separates the data channel and outputs the data channel to the PDSCH processing unit 230.

Here, the PDCCH or the EPDCCH is used to notify (designate) the terminal of the downlink control information (DCI). For example, the downlink control information includes information regarding resource allocation of the PDSCH, information regarding Modulation and Coding scheme (MCS), information regarding a scrambling identity (also referred to as a scrambling link identifier), and information regarding a reference signal sequence identity (referred to as a base sequence identity, a base sequence identifier, or a base sequence index).

Further, a plurality of formats are defined for the downlink control information transmitted with the PDCCH or the EPDCCH. Here, the format of the downlink control information is also referred to as a DCI format. That is, fields for each piece of the uplink control information are defined in the DCI format.

For example, DCI format 1 and DCI format 1A used for scheduling of one PDSCH (transmission of a code word of one PDSCH and one downlink transport block) in one cell is defined as the DCI format for the downlink. That is, DCI format 1 and DCI format 1A are used for transmission in the PDSCH using one transmission antenna port. Further, DCI format 1 and DCI format 1A is also used for transmission of the PDSCH based on transmission diversity (TxD) using a plurality of transmission antenna ports.

Further, DCI format 2, DCI format 2A, DCI format 2B, and DCI format 2C used for scheduling of one PDSCH (transmission of codeword of PDSCHs up to 2 or downlink transports up to 2) in one cell (transmission point) are defined as DCI formats for the downlink. That is, DCI format 2, DCI format 2A, DCI format 2B, and DCI format 2C are used for transmission in the PDSCH using MIMO based on a plurality of transmission antenna ports from one cell (transmission points). Further, DCI format 2D used for scheduling of one PDSCH (transmission of codeword of PDSCHs up to 2 or downlink transports up to 2) in one or a plurality of cells (transmission points) is defined as the DCI format for the downlink. That is, DCI format 2D is used for transmission in the PDSCH using MIMO based on a plurality of transmission antenna ports from one or a plurality of cells (transmission points).

Here, a format of the control information is defined in advance. For example, the control information may be defined according to a purpose of notification from the base station 100 to the terminal 200. Specifically, the control information can be defined for information regarding allocation of a downlink data channel to the terminal 200, information regarding allocation of the uplink data channel (PUSCH) and the uplink control channel (PUCCH) to the terminal 200, and/or information for controlling transmission power to the terminal 200. Accordingly, for example, in a case where the base station 100 transmits the PDSCH to the terminal 200, the base station 100 transmits the control channel to which the control information including the information regarding allocation of the PDSCH to the terminal 200 is mapped, and the PDSCH allocated based on the control information. Further, for example, in a case where the base station 100 allocates the PUSCH to the terminal 200, the base station 100 transmits the PUCCH to which the control information including the information regarding allocation of the PUSCH to the terminal 200 is mapped. Further, the base station 100 can also transmit, to the same terminal 200, a plurality of pieces of different control information or the same control information using a different format or the same format in the same subframe. Further, in a case where the base station 100 transmits the downlink data to the terminal 200, the base station 100 may also transmit the downlink data channel in a subframe different from the subframe for transmitting the control channel to which the control information including the information regarding allocation of the PDSCH to the terminal 200 is mapped.

Here, the PDCCH region is also referred to as cell-specific control channel region since the PDCCH region is a region specific to the base station 100. Further, the EPDCCH region is also referred to as a terminal-specific control channel region since the EPDCCH region is a region specific to the terminal 200, which is configured through RRC signaling from the base station 100. Further, the EPDCCH region is configured in units of resource block pairs or resource block groups, which are groups of a plurality of resource block pairs. Further, the EPDCCH region can be configured as the region specific to the base station 100. That is, the EPDCCH region is used as a region common to some or all of the terminals communicating with the base station 100.

Further, the base station 100 and the terminal 200 transmit and receive signals in a higher layer. For example, the base station 100 and the terminal 200 transmit and receive a radio resource control signal (also referred to as RRC signaling; Radio Resource Control signal, RRC message; Radio Resource Control message, or RRC information; Radio Resource Control information) in an RRC layer (Layer 3). Here, in the RRC layer, a dedicated signal transmitted from the base station 100 to any terminal is also referred to as a dedicated signal. That is, a configuration (information) notified of by the base station 100 using the dedicated signal is a configuration specific to any terminal.

Further, the base station 100 and the terminal 200 transmit and receive a MAC control element in a MAC (Mediam Access Control) layer (layer 2). Here, the RRC signaling and/or the MAC control element is also referred to as a signal of the higher layer (Higher layer signaling).

<Frame Format>

Figure 3:
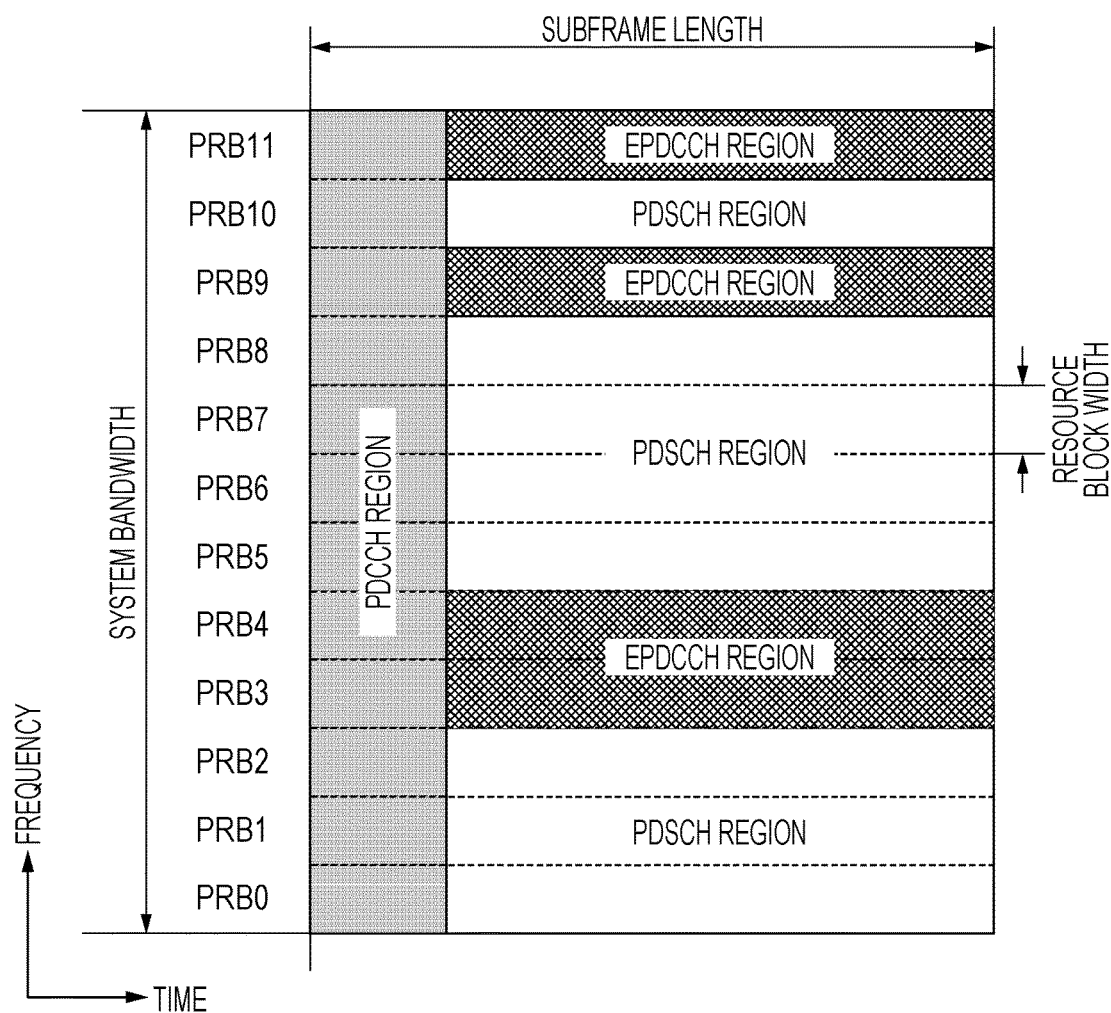
FIG. 3 is a diagram illustrating an example of a subframe to be transmitted by the base station.

FIG. 3 is a diagram illustrating an example of a subframe transmitted by the base station. In this example, one subframe in which a system bandwidth includes 12 physical resource block (PRB) pairs is illustrated. Further, in the following description, the resource block pair will be simply described as a resource block, a PRB, or an RB. That is, in the following description, the resource block, the PRB, or the RB includes the resource block pair. Further, in the subframe, 0 or more first OFDM symbols are PDCCH regions. The terminal 200 is notified of the number of OFDM symbols in the PDCCH region. For example, in the PDCCH region, a notification region dedicated to the first OFDM symbol is configured, and thus, the PDCCH region can be dynamically notified of in each subframe. Further, the PDCCH region can be quasi-statically notified of using the control information of the higher layer. Regions other than the PDCCH region are shared channel regions. The shared channel region includes a data channel region and/or an EPDCCH region. In the example of FIG. 3, one EPDCCH region includes PRB3, PRB4, PRB9, and PRB11.

Here, the base station 100 notifies (set) the terminal 200 of the EPDCCH region through the control information of the higher layer. For example, the control information in which the EPDCCH region is configured is control information set for each PRB pair or each group of PRB pairs. In the example shown in FIG. 3, PRB3, PRB4, PRB9 and PRB11 are configured as the EPDCCH regions. Further, the EPDCCH region is allocated in units of a predetermined number of PRBs. For example, the predetermined number of PRBs can be set to 4. In this case, the base station 100 sets a 4-multiple number of PRBs as the EPDCCH region for the terminal 200.

Figure 4:
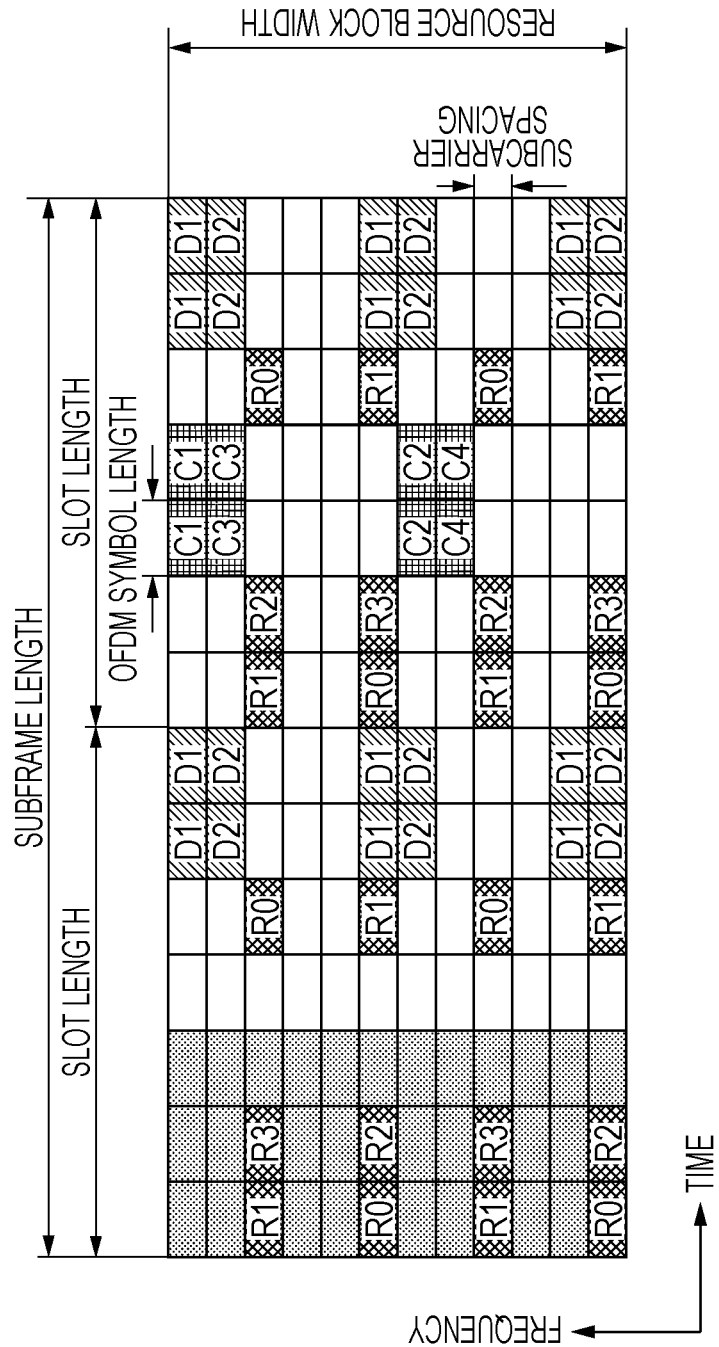
FIG. 4 is a diagram illustrating an example of one resource block pair to be mapped by the base station.

FIG. 4 is a diagram illustrating an example of one resource block pair mapped by the base station. One resource block includes a predetermined area in a frequency direction and a predetermined area in a time direction. In one resource block pair, two resource blocks are arranged consecutively in a time direction. Further, in the resource block pair, a resource block of the first half in the time direction is also referred to as a first resource block, and a resource block of the second half in the time direction is also referred to as a second resource block. FIG. 4 illustrates one resource block pair, and one resource block includes 12 subcarriers in the frequency direction and 7 OFDM symbols in the time direction. Resources including one OFDM symbol and one subcarrier are referred to as a resource element. The resource block pairs are arranged in the frequency direction, and the number of the resource block pairs can be set for each base station. For example, the number of the resource block pairs can be set to 6 to 110. A width in the frequency direction at this time is referred to as a system bandwidth. Further, the time direction of the resource block pairs is referred to as a subframe. Among the respective subframes, seven OFDM symbols before and after in the time direction are also referred to as a slot. Further, in the following description, the resource block pair is simply also referred to as a resource block. Further, in the resource block pair, the resource block of the first half in the time direction is referred to as a first resource block, and the resource block of the second half in the time direction is also referred to as a second resource block.

In FIG. 4, among shaded resource elements, R0 to R3 indicate cell-specific reference signals of antenna ports 0 to 3, respectively. Hereinafter, the cell-specific reference signals of the antenna ports 0 to 3 are also referred to as common reference signals (CRSs). Here, the CRSs illustrated in FIG. 4 correspond to a case of the four antenna ports, but the number of the antenna ports may be changed. For example, the CRS for one antenna port or two antenna ports can be mapped. Further, the cell-specific reference signal can be shifted in the frequency direction based on the cell ID. For example, the cell-specific reference signal may be shifted in the frequency direction based on a remainder obtained by dividing the cell ID by 6. A pattern of the shift at this time is 6. That is, in a case where the number of antenna ports of the cell-specific reference signal is 1, the pattern of resource elements used for the cell-specific reference signal is 6. In a case where the numbers of antenna ports of the cell-specific reference signal are 2 and 4, the pattern of resource elements used for the cell-specific reference signal is 3.

Here, as the cell-specific reference signal, any signal (sequence) may be used as long as the signal is known to both the base station 100 and the terminal 200. For example, a random number or a pseudo-noise sequence based on a previously assigned parameter such as a number (cell ID) specific to the base station 100. Further, as a method of causing to be orthogonal between the antenna ports, a method of nulling (zero) the resource element to which the cell-specific reference signal is mapped between the antenna ports, a code division multiplexing method using a pseudo-noise sequence, a method that is a combination of such methods, or the like may be used. Further, the cell-specific reference signal may not be multiplexed with all subframes or may be multiplexed with only some of the subframes.

In FIG. 4, a reference signal for channel state measurement of antenna ports 15 to 22 may be mapped as the cell-specific reference signal different from the cell-specific reference signal of antenna ports 0 to 3. In FIG. 4, C1 to C4 among the shaded resource elements indicate reference signals for channel state measurement of Code Division Multiplexing (CDM) Group 1 to CDM group 4, respectively. In the reference signal for channel state measurement, an orthogonal code using a Walsh code is first mapped, and then, a Gold code or a scrambling code using a pseudo-noise sequence is superimposed. Further, the reference signal for channel state measurement is code division multiplexed using an orthogonal code such as the Walsh code in the CDM group. Further, the reference signals for channel state measurement are subjected to frequency-division multiplexing (FDM) with each other between the CDM groups. Further, the reference signal for channel state measurement of antenna ports 15 and 16 are mapped to C1, the reference signal for channel state measurement of antenna ports 17 and 18 are mapped to C2, the reference signal for channel state measurement of antenna ports 19 and 20 are mapped to C3, and the reference signal for channel state measurement of antenna ports 21 and 22 are mapped to C4. Further, the reference signal for channel state measurement can be configured as a reference signal corresponding to the eight antenna ports, including antenna ports 15 to 22.

Further, the reference signal for channel state measurement can be configured as a reference signal corresponding to four antenna ports including antenna ports 15 to 18. Further, the reference signal for channel state measurement can be configured as a reference signal corresponding to two antenna ports including antenna ports 15 and 16. Further, the reference signal for channel state measurement can be configured as a reference signal corresponding to one antenna port of antenna port 15. Further, the reference signal for channel state measurement can be mapped to some subframes, and for example, the reference signal for channel state measurement can be mapped to a plurality of subframes. Further, the resource element to which the reference signal for channel state measurement is mapped may be different from the resource element illustrated in FIG. 4. Further, as a mapping pattern for the resource elements of the reference signal for channel state measurement, a plurality of patterns may be defined in advance. Further, the base station 100 can configure a plurality of reference signals for channel state measurement for the terminal 200. Further, transmission power of the reference signal for channel state measurement can be further configured, and for example, the transmission power can be zero. The base station 100 configures the reference signal for channel state measurement through RRC signaling as terminal-specific control information for the terminal 200. The terminal 200 generates feedback information using the CRS and/or reference signal for channel state measurement based on the configuration from the base station 100.

In FIGS. 4, D1 and D2 among the shaded resource elements indicate the terminal-specific reference signal or the reference signal for EPDCCH demodulation of Code Division Multiplexing (CDM) Group 1 and CDM group 2, respectively. In the terminal-specific reference signal or the reference signal for EPDCCH demodulation, an orthogonal code using a Walsh code is first mapped, and then, a pseudo-random sequence using a Gold code is superimposed as a scrambling sequence. Further, the terminal-specific reference signal or the reference signal for EPDCCH demodulation is code division multiplexed using the orthogonal code such as Walsh code within the CDM group. Further, the terminal-specific reference signal or the reference signal for EPDCCH demodulation is subjected to FDM between the CDM groups. Here, the terminal-specific reference signal or the reference signal for EPDCCH demodulation can be mapped up to eight ranks using some or all of the eight antenna ports (antenna ports 7 to 14) according to the control channel or the data channel that is mapped to the resource block pair. Further, in the terminal-specific reference signal or the reference signal for EPDCCH demodulation, a spreading code length of the CDM or the number of resource elements to be mapped may be changed be according to the number of ranks to be mapped.

The terminal-specific reference signal of antenna ports 7, 8, 11 and 13 has a sequence length of 4 chips and is mapped to CDM group 1. The terminal-specific reference signal of antenna ports 9, 10, 12 and 14 has a sequence length of 4 chips and is mapped to CDM group 2. Further, the reference signal for EPDCCH demodulation of antenna ports 107 and 108 has a sequence length of 4 chips and is mapped to CDM group 1. The reference signal for EPDCCH demodulation of antenna ports 109 and 110 has a sequence length of 4 chips and is mapped to CDM group 2.

A reference signal for EPDCCH demodulation of antenna ports 107 to 110 and the terminal-specific reference signal of antenna ports 7 to 14 may be configured to be partially different. For example, a scrambling sequence used for the reference signal for EPDCCH demodulation of antenna ports 107 to 110 may be different from a scrambling sequence used for the terminal-specific reference signal of antenna ports 7 to 14.

Further, resource elements filled with white are resources to which the PDSCH and/or the EPDCCH can be mapped. The resources to which the PDSCH and/or the EPDCCH can be mapped are the OFDM symbols that are different from the OFDM symbols of resources to which the PDCCH in the subframe can be mapped. In the example of FIG. 4, the number of OFDM symbols used for transmission of the PDCCH is 3, and the symbols includes a first OFDM symbols to a third OFDM symbol in the subframe. Further, the resources to which the PDSCH and/or the EPDCCH can be mapped includes a fourth OFDM symbol to a last OFDM symbol in the subframe, and the number of OFDM symbols of the resources to which the PDSCH and/or the EPDCCH can be mapped is 11. The resources to which the PDCCH, the PDSCH, and/or EPDCCH can be mapped may be configured by setting a predetermined number of OFDM symbols for each subframe. Further, the resources to which the PDSCH and/or the EPDCCH can be mapped may also be mapped to predetermined OFDM symbols, which are defined in advance, regardless of the number of OFDM symbols used for transmission of the PDCCH in the subframe. Further, the resources to which the PDSCH and/or the EPDCCH can be mapped may be configured for each resource block pair. Further, the resources to which the EPDCCH can be mapped may be all OFDM symbols in the subframe regardless of the number of OFDM symbols used for transmission of the PDCCH.

Further, resources to which the EPDCCH can be mapped can be independently configured in each EPDCCH set. Information indicating the resources to which the EPDCCH can be mapped can be included in control information notified of through RRC signaling that is configured in each EPDCCH set. For example, the information indicating the resources to which the EPDCCH can be mapped is a start symbol in a subframe of the resources to which the EPDCCH can be mapped, and a predetermined value (for example, a value of any one of 0 to 4) may be set in each EPDCCH set.

Here, the number of the resource blocks can vary according to a frequency bandwidth (system bandwidth) to be used by the communication system. For example, 6 to 110 resource blocks may be used and a unit thereof is also referred to as a component carrier. Further, the base station 100 may also configure a plurality of component carriers for the terminal 200 through frequency aggregation. For example, the base station 100 may form one component carrier at 20 MHz for the terminal 200, configure five component carriers continuously and/or non-continuously in the frequency direction, and set a total bandwidth available to the communication system to 100 MHz.

Then, in the wireless communication system in this embodiment, aggregation of a plurality of serving cells (also simply referred to as cells) is supported in a downlink and an uplink (referred to as carrier aggregation). For example, in each serving cell, a transmission bandwidth including 110 resource blocks is available. Further, in the carrier aggregation, one serving cell is defined as a primary cell (PCell). Further, in the carrier aggregation, a serving cell other than the primary cell is defined as a secondary cell (SCell).

Further, a carrier corresponding to the serving cell in the downlink is defined as a downlink component carrier (DLCC). Further, a carrier corresponding to the primary cell in the downlink is defined as a downlink primary component carrier (DLPCC). Further, a carrier corresponding to the secondary cell in the downlink is defined as a downlink secondary component carrier (DLSCC).

Further, a carrier corresponding to the serving cell in the uplink is defined as an uplink component carrier (ULCC). Further, a carrier corresponding to the primary cell in the uplink is defined as an uplink primary component carrier (ULPCC). Further, a carrier corresponding to the secondary cell in the uplink is defined as an uplink secondary component carrier (ULSCC).

That is, in the carrier aggregation, a plurality of component carriers are aggregated so as to support a wide transmission bandwidth. Here, for example, a primary base station may be regarded as a primary cell, and a secondary base station may be regarded as secondary cell (the base station 100 configures for the terminal 200) (also referred to as HetNet deployment with a carrier aggregation).

<PDCCH>

Hereinafter, details of a configuration of the PDCCH will be described. The PDCCH (first control channel) includes a plurality of control channel elements (CCEs). The number of CCEs used in each downlink component carrier depends on a downlink component carrier bandwidth, the number of OFDM symbols constituting the PDCCH, and the number of transmission antenna ports of the cell-specific reference signal of the downlink according to the number of transmitting antennas of the base station 100 for use in communication. The CCE includes a plurality of downlink resource elements (resources defined by one OFDM symbol and one subcarrier).

A number for identifying the CCE used between the base station 100 and the terminal 200 is assigned to the CCE. Numbering of the CCE is performed based on a predetermined rule. Here, the CCE_t indicates a CCE with a CCE number t. The PDCCH includes aggregation consisting of a plurality of CCEs (CCE Aggregation). The number of CCEs constituting this aggregation is referred to as a "CCE aggregation level". The CCE aggregation level constituting the PDCCH is set in the base station 100 according to a coding rate set in the PDCCH and the number of bits of the DCI included in the PDCCH. Further, a combination of possible CCE aggregation levels used for the terminal 200 is determined in advance. Further, aggregation consisting of n CCEs is referred to as a "CCE aggregation level n".

One resource element group (REG) includes four adjacent downlink resource elements in the frequency domain. Further, one CCE includes nine different resource element groups distributed in the frequency domain and the time domain. Specifically, for all downlink component carriers, interleaving is performed on all numbered resource element groups in units of the resource element groups using a block interleaver, and one CCE includes nine resource element groups of which the numbers are consecutive after interleaving.

A region SS (Search Space) for searching for the PDCCH is configured in each terminal. The SS includes a plurality of CCEs. The SS includes a plurality of CCEs of which the numbers is consecutive from the smallest CCE, and the number of the plurality of CCE having consecutive numbers is determined in advance. An SS for each CCE aggregation level includes aggregation of a plurality of PDCCH candidates. The SSs are classified into Cell-specific SS (CSS) of which the number is common in the cell from the smallest CCE, and a UE-specific SS (USS) of which the number is specific to the terminal from the smallest CCE. In the CSS, a PDCCH to which control information to be read by a plurality of terminals, such as information regarding system information or paging, is assigned, or a PDCCH to which a downlink/uplink grant indicating an instruction for fallback or random access to a lower transmission scheme is assigned may be arranged.

The base station 100 transmits the PDCCH using one or more CCEs in the SS that is configured in the terminal 200. The terminal 200 performs decoding of the reception signal using one or more CCEs in the SS to perform a process of detecting the PDCCH destined for the terminal 200 (referred to as blind decoding). The terminal 200 configures an SS different for each CCE aggregation level. Then, the terminal 200 performs the blind decoding using the CCEs of a predetermined combination of the SS different for each CCE aggregation level. That is, the terminal 200 performs the blind decoding on each PDCCH candidate in the SS different for each CCE aggregation level. A series of processes in the terminal 200 is referred to as monitoring of the PDCCH.

<EPDCCH>

Hereinafter, details of the EPDCCH will be described. The EPDCCH (second control channel; Enhanced PDCCH) is mapped to the EPDCCH region. In a case where the base station 100 notifies the terminal 200 of the EPDCCH through the EPDCCH region, the base station 100 configures the EPDCCH region for the terminal 200, and maps the EPDCCH for the terminal 200 to the EPDCCH region. Further, in a case where the base station 100 notifies the terminal 200 of the PDCCH through the PDCCH region, the base station 100 may map the PDCCH for the terminal 200 to the PDCCH region regardless of the configuration of the EPDCCH region for the terminal 200. Further, in the case where the base station 100 notifies the terminal 200 of the PDCCH through the PDCCH region, the base station 100 may map the PDCCH for the terminal 200 to the PDCCH region in the case where the base station 100 does not configure the EPDCCH region for the terminal 200.

On the other hand, in the case where the EPDCCH region is configured by the base station 100, the terminal 200 can perform blind decoding on the PDCCH destined for the terminal 200 in the PDCCH region and/or the EPDCCH destined for the terminal 200 in EPDCCH region. Further, in the case where the EPDCCH region is not configured by the base station 100, the terminal 200 may not perform blind decoding on the EPDCCH destined for the terminal 200 in the EPDCCH region.

The base station 100 configures one or more EPDCCH regions for the terminal 200 through the RRC signaling. Each EPDCCH region includes one or more of RB pairs. For example, the EPDCCH region may be configured in units of RBGs, which are an RB pair or a group of RB pairs. Here, the number of RB pairs constituting the EPDCCH region is one of a predefined plurality of predetermined values. For example, the number of RB pairs constituting the EPDCCH region can be 2, 4 or 8. The number of RB pairs constituting the EPDCCH region may be included in a configuration regarding the EPDCCH region that is configured through RRC signaling. Further, the number of RB pairs constituting the EPDCCH region may be implicitly set according to a system bandwidth of the cell or the component carrier. Further, the base station 100 may configure a search space (search space) in each EPDCCH region configured in the terminal 200.

The EPDCCH mapped to the EPDCCH region is processed with each pieces of control information for one or more terminals, and subjected to a scrambling process, a modulation process, a layer mapping process, a precoding process, or the like. Further, the same precoding process can be performed on the EPDCCH and the reference signal for EPDCCH demodulation.

The EPDCCH includes a predetermined number of enhanced control channel elements (ECCE: Enhanced CCE). For example, one EPDCCH includes 1, 2, 4, 8, 16, or 32 ECCEs. Here, the number of ECCEs constituting one EPDCCH defines an aggregation level (ECCE aggregation level).

The ECCE includes a predetermined number of enhanced resource element groups (EREGs: Enhanced REGs). For example, one ECCE includes 4 or 8 EREGs. Further, the number of EREGs constituting one ECCE can be defined according to the type of subframe in which EPDCCH region is configured and/or the type of cyclic prefix. For example, in a case where a size of the physical resources for mapping the EPDCCH varies with the type of subframe in which the EPDCCH region is configured and/or the type of cyclic prefix, the number of EREGs constituting one ECCE can be defined according to the size of the physical resource.

The EREG includes a predetermined number of resource elements. For example, one EREG includes 16 resource elements in the same RB pair.

Further, in the case of local mapping, the ECCE may include predetermined resource elements in the same RB pair without using the EREG. In this case, the ECCE in the local mapping may include resource elements constituting the EREG used for the ECCE in distributed mapping. For example, the ECCE in the local mapping may include 36 or 72 resource elements in the same RB pair.

Hereinafter, details of the configuration of EREG in the RB pair will be described. One RB pair constitutes a predetermined number of EREGs. For example, one RB pair constitutes 16 EREGs. Each EREG has a number for identification (index) given thereto. For example, in a case where one RB pair constitutes 16 EREGs, 0 to 15 are used as the EREG number that identifies the EREG. The EREGs with EREG numbers of 0 to 15 are referred to as EREG0 to EREG15. Numbering of the EREG in one RB pairs is performed based on a predetermined rule.

Figure 5:
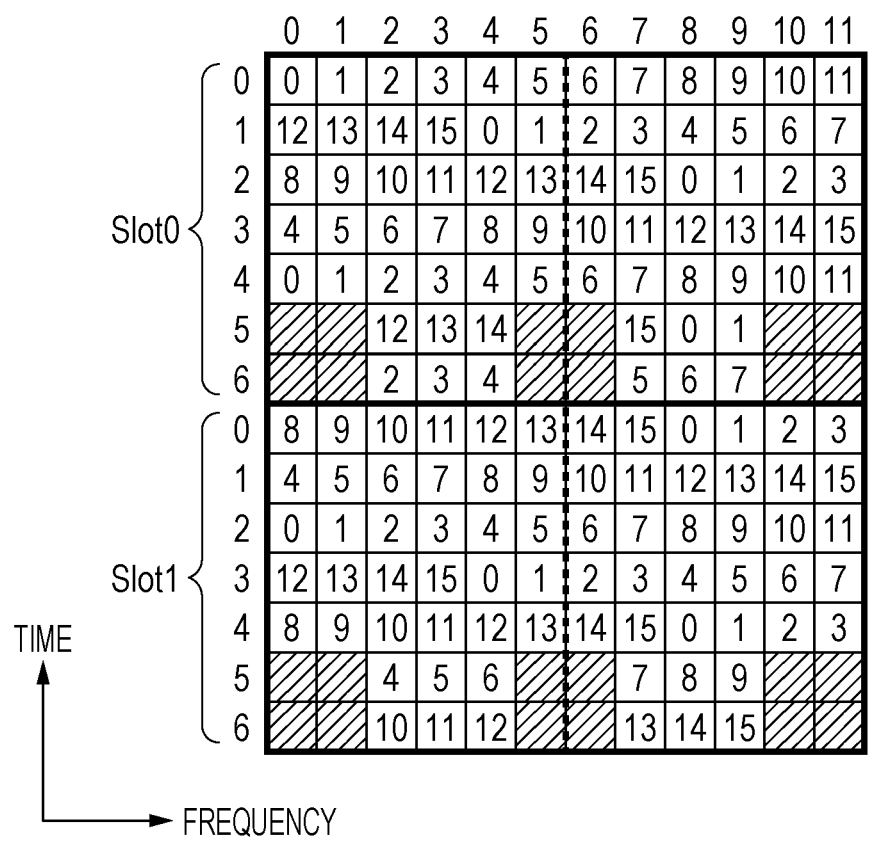
FIG. 5 illustrates an EREG configuration in one RB pair.
Figure 14:
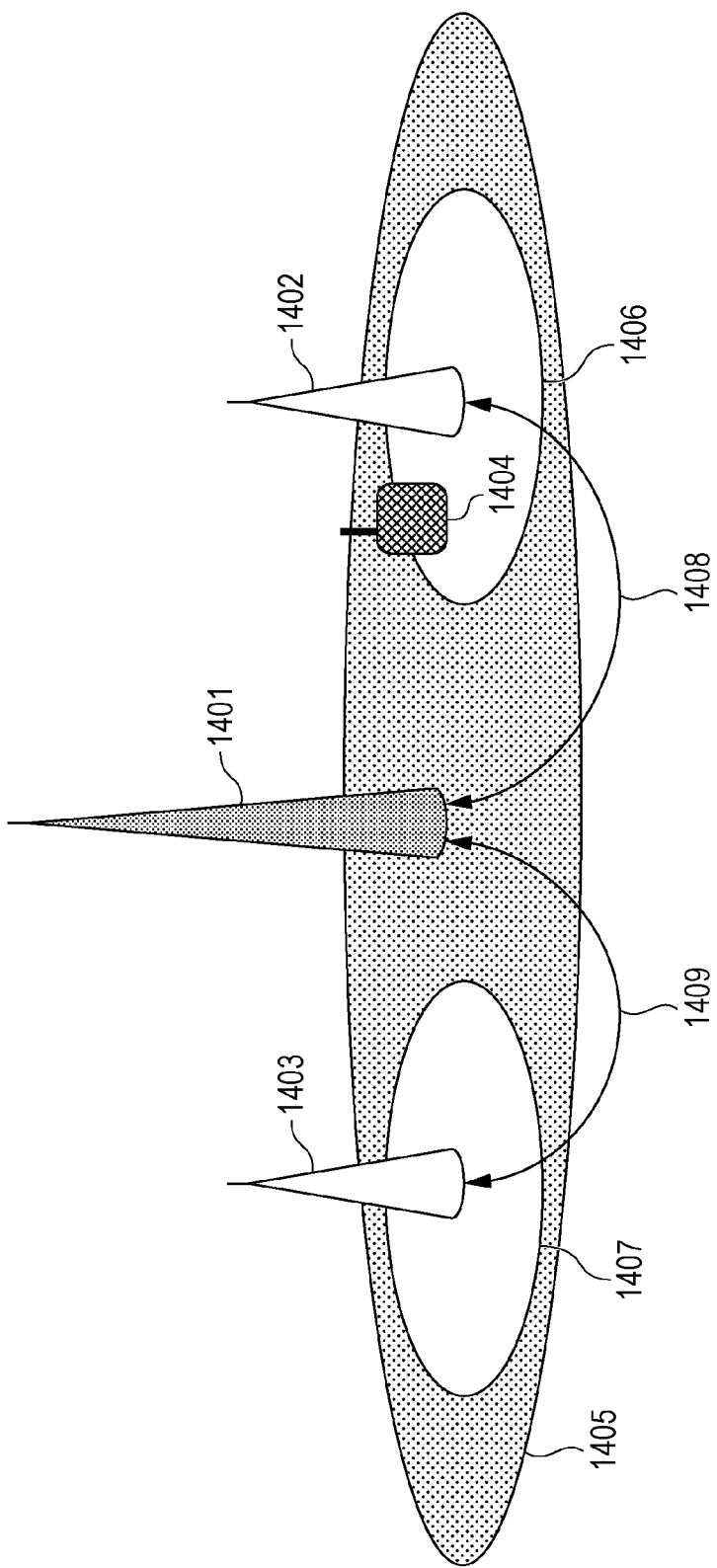
FIG. 14 is a schematic diagram of a wireless communication system using a heterogeneous network deployment.

FIG. 5 illustrates an EREG configuration in one RB pair. A number assigned to each resource element indicates the EREG number. In one RB pair, the EREG numbers of EREG0 to EREG15 are mapped in order using a frequency-first mapping rule (frequency-first and time-second).

Further, in the following description, in the respective RBs, the resource element indicated by a $k^{th}$ subcarrier and an $l^{th}$ OFDM symbol is indicated as (k, l). For 7 OFDM symbols in the respective slots of the respective RB pairs, an index (l=0, 1, . . . , 6) is assigned to each OFDM symbol in a time direction. The index for the OFDM symbol is also referred to as an OFDM symbol number. Further, for 12 subcarriers in the respective RB pairs, an index (k=0, 1, . . . , 11) is assigned to each subcarrier in a frequency direction. The index for the subcarrier is also referred to as a subcarrier number. Further, the subcarrier number can be consecutively assigned across the system band (component carrier). For example, when the subcarrier number ($k_0$=0, 1, . . . , 11) in the respective RB pairs is assigned, the subcarrier number k in the system band is also expressed as $N_{sc}^{RB} \times n_{RB} + k_0$. Here, $N_{sc}^{RB}$ indicates the number of subcarriers in one RB or RB pair. $n_{RB}$ indicates an index of the RB or RB pair that can be consecutively assigned across the system band (component carrier), and $n_{RB}$=0, 1, . . . , $N_{RB}^{DL}$−1. The index of the RB or RB pair is also referred to as an RB number or an RB pair number. Further, for respective slots, an index (slot number) is assigned to the slot. For example, even-numbered slot numbers indicate first half slots (slot 0) in each subframe. Further, odd-numbered slot numbers indicate second half slots (slot 1) in each subframe.

Here, the frequency-first mapping rule is a rule in which the mapping targets are first mapped to resource elements in a high-frequency direction in the respective OFDM symbols sequentially from a resource element of a subcarrier at a lowest frequency that is a first OFDM symbol among a plurality of resource elements in the mapping region, and then, the same mapping is performed on the subsequent OFDM symbols. Specifically, the frequency-first mapping rule is a rule in which mapping targets are mapped to a plurality of resource elements within the mapping area, as follows. Here, the mapping targets include, for example, an EREG, an EREG number, an ECCE, an ECCE number, an RB pair, an RB pair number, an antenna port, an antenna port number, a signal, data, a channel, an EPDCCH, and/or an EPDCCH number. Further, since the mapping in the frequency-first mapping rule can also be applied to association of antenna ports or the like, the mapping can be replaced with the association. That is, the frequency-first mapping rule may be replaced with a frequency-first association rule. Further, the frequency-first mapping rule and the frequency-first association rule are also referred to as a frequency-first rule.

(1) A mapping target is mapped to an OFDM symbol early in a time direction and the resource element of the subcarrier at a lowest frequency. Further, mapping targets are sequentially mapped to resource elements in a direction in which the frequency increases from such a resource element.

(2) In a case where the resource element to be mapped does not exist in the OFDM symbol, a mapping target is mapped to a next OFDM symbol and the resource element of the subcarrier at a lowest frequency. Further, mapping targets are sequentially mapped to resource elements in a direction in which the frequency increases from such a resource element.

(3) (2) is repeated until the resource element to be mapped does not exist in the region.

Further, for mapping, a resource element to which a collision signal (an overwrite signal or an interrupt signal) different from the mapping target is mapped is excluded. That is, in a case where the collision signal (an overwriting signal or an interrupt signal) different from the mapping target is mapped to the resource element in the region to which the mapping target is mapped, the resource element is skipped and the mapping target is mapped to a resource element to be next mapped. Here, the collision signal includes, for example, a cell-specific reference signal, a reference signal for channel state measurement, a terminal-specific reference signal, a reference signal for EPDCCH demodulation, an EPDCCH, a PDCCH, a channel, a broadcast channel, a synchronization signal, and/or data. Further, in the case where the collision signal different from the mapping target is mapped to the resource element in the region to which the mapping target is mapped, the resource element is not skipped and the mapping target is mapped, but the resource element may be overwritten with the collision signal. That is, the target of mapping to the resource element to which the collision signal is mapped is punctured. Further, whether the mapping target is skipped or punctured for the resource element to which the collision signal is mapped may be determined according to the collision signal.

In FIG. 5, the EREG numbers, EREG0 to EREG15, are sequentially mapped to resource elements with k increasing from (0, 0) in slot 0. Further, in a case where k reaches a maximum value, the EREG number is increased by 1 and sequentially mapped to the resource elements with k increasing from (0, 1). This is repeated until l reaches the maximum value. Further, in slot 1, the same mapping is similarly performed, subsequently to the slot 0.

Further, the resource elements to which the reference signal for EPDCCH demodulation is mapped is skipped and the EREG number is mapped. Further, the EREG number is mapped regardless of the mapping of the cell-specific reference signal, the reference signal for channel state measurement, and/or the PDCCH region. That is, the EREG number is mapped to the resource element in the RB pair without depending on the signal mapped to the resource element, except for the reference signal for EPDCCH demodulation. The terminal 200 recognizes that the EPD- CCH is not mapped to the resource element to which the reference signal for EPDCCH demodulation, the cell-specific reference signal, the reference signal for channel state measurement, and/or the PDCCH region is mapped. Accordingly, since the definition of the EREG is determined without depending on the signal mapped to the resource element, it is possible to reduce the process or the storage capacity in the base station 100 and the terminal 200.

FIG. 6 is a diagram illustrating a combination of resource elements for the EREG number in one RB pair. FIG. 6 illustrates a combination of resource elements for the EREG number in the EREG configuration illustrated in FIG. 5. Each EREG includes nine resource elements.

Further, the ECCE includes a predetermined number of EREGs. For example, the ECCE includes 4 or 8 EREGs. Here, in the RB pair, the number of resource elements which can be used for mapping of the EPDCCH is determined depending on the number of resource elements to which the cell-specific reference signal, the reference signal for channel state measurement, and/or the PDCCH region is mapped. That is, for the number of resource elements which can be used for mapping of the EPDCCH, the number of EREGs constituting the ECCE, which is the number of resource elements other than the cell-specific reference signal, the reference signal for channel state measurement, and/or the PDCCH region is determined according to the number of resource elements which can be used for mapping of the EPDCCH in the RB pair. For example, the number of EREGs constituting the ECCE is 4 when the number of resource elements which can be used for mapping of the EPDCCH is equal to or greater than a predetermined number. The number of EREGs constituting the ECCE is 8 when the number of resource elements which can be used for mapping of the EPDCCH is smaller than the predetermined number. It is preferable for the predetermined number to be set so that the EPDCCH mapped by using the ECCE is not below a predetermined coding rate. Accordingly, the terminal 200 can maintain predetermined reception quality upon receiving the EPDCCH.

Further, the ECCE includes EREGs in one or a plurality of RB pairs. That is, a plurality of mapping rules (mapping methods or associations) between the EREG and the ECCE are defined. The mapping rule between the EREG and the ECCE is distributed mapping (distributed transmission) or local mapping (local transmission). Further, the mapping rule between the EREG and the ECCE can be configured for each EPDCCH region. The distributed mapping or the local mapping is configured in each EPDCCH region. The base station 100 can include a configuration indicating distributed mapping or local mapping in the configuration regarding EPDCCH for the terminal 200. In the distributed mapping, the ECCE is configured to be mapped using the EREG in a plurality of RB pairs and distributed among multiple RB pairs. In the case of the distributed mapping, some of the EREGs constituting the ECCE are mapped to the EREGs in a different RB pair. In the local mapping, the ECCE is locally mapped to one RB pair. In the case of local mapping, all of EREGs constituting the ECCE are mapped using the EREGs in one RB pair.

Further, the EREGs constituting the ECCE may be EREGs with predetermined EREG numbers.

In a case where the ECCE includes four EREGs, the EREG numbers of the EREGs can be mod(i, 16), mod(i+4, 16), mod(i+8, 16), and mod(i+12, 16). Here, i is an integer, and mod(a, b) indicates a remainder obtained by dividing a by b.

In a case where the ECCE includes eight EREGs, the EREG numbers of the EREGs can be mod(i, 16), mod(i+2, 16), mod(i+4, 16), mod(i+6, 16), mod(i+8, 16), mod(i+10, 16), mod(i+12, 16), and mod(i+14,16).

In a case where the ECCE includes four EREGs and the EPDCCH is locally mapped, four ECCEs are configured in each RB pair. In this case, i is an integer from 0 to 3. An ECCE includes EREG0, EREG4, EREG8, and EREG12 in the same RB pair. Another ECCE includes EREG1, EREG5, EREG9, and EREG13 in the same RB pair. Still another ECCE includes EREG2, EREG6, EREG10, and EREG14 in the same RB pair. Still another ECCE includes EREG3, EREG7, EREG11, and EREG15 in the same RB pair.

In a case where the ECCE includes eight EREGs and the EPDCCH is locally mapped, two ECCEs are configured in each RB pair. In this case, i is 0 or 1. An ECCE includes EREG0, EREG2, EREG4, EREG6, EREG8, EREG10, EREG12, and EREG14 in the same RB pair. Another ECCE includes EREG1, EREG3, EREG5, EREG7, EREG9, EREG11, EREG13, and EREG15 in the same RB pair.

In a case where the EPDCCH is subjected to distributed mapping, each ECCE includes EREGs in a plurality of RB pairs. Further, in the configuration of an ECCE, RB pairs constituting the EREG can be determined based on the number of RB pairs constituting the EPDCCH region. In a case where the ECCE includes four EREGs, and the EPDCCH region includes four RB pairs, each ECCE includes EREGs in different RB pairs. In this case, 16 ECCEs are configured, and i is an integer from 0 to 15. For example, an ECCE includes EREG0, EREG4, EREG8 and EREG12 in different RB pairs. Another ECCE includes EREG1, EREG5, EREG9, and EREG13 in a different RB pair. Still another ECCE includes EREG2, EREG6, EREG10, and EREG14 in a different RB pair. Still another ECCE includes EREG3, EREG7, EREG11, and EREG15 in a different RB pair.

Further, in a case where the ECCE includes four EREGs and the EPDCCH region includes more than 4 RB pairs, each ECCE includes EREGs in different RB pairs, similarly to the case in which the EPDCCH region including four RB pairs. Further, in a case where the ECCE includes four EREGs and the EPDCCH region includes two RB pairs, each ECCE includes two EREGs in each RB pair.

In a case where the ECCE includes eight EREGs and the EPDCCH region includes eight RB pairs, each ECCE includes EREGs in a different RB pair. In this case, 16 ECCEs are configured and i is an integer from 0 to 15. For example, an ECCE includes EREG0, EREG2, EREG4, EREG6, EREG8, EREG10, EREG12, and EREG14 in a different RB pair. Another ECCE includes EREG1, EREG3, EREG5, EREG7, EREG9, EREG11, EREG13, and EREG15 in a different RB pair.

Further, even in a case where the ECCE includes eight EREGs and the EPDCCH region includes 8 or more RB pairs, each ECCE may include EREGs in the four RB pairs. Accordingly, in a case where the number of EPDCCHs mapped to the EPDCCH region is small, some RB pairs in the EPDCCH region can be used for mapping of other channels such as the PDSCH instead of being used or mapping of the EPDCCH. Therefore, utilization efficiency of the resources is improved.

Further, in the case where the ECCE includes eight EREGs and the EPDCCH region includes eight or more RB pairs, each ECCE includes EREGs in different RB pairs, similarly to the case in which the EPDCCH region includes eight RB pairs. In the case where the ECCE includes eight EREGs and the EPDCCH region includes four RB pairs, each ECCE includes two EREG in each RB pair. In the case where the ECCE includes four EREGs and the EPDCCH region includes two RB pairs, each ECCE includes four EREGs in each RB pair.

From the above, a method in which the base station 100 maps the EPDCCH for the terminal 200 to the PRB pair is as follows. First, the EPDCCH is mapped to one or a plurality of ECCEs. Then, in the case of distributed mapping, a plurality of EREGs constituting the ECCE is mapped to EREGs in a plurality of RB pairs. Further, in the case of local mapping, a plurality of EREGs constituting the ECCE is mapped to the EREG in one RB pair. Then, one or a plurality of RB pairs constituting each EREG are mapped to the PRB pair of the EPDCCH region.

Here, numbering of RB pairs used as the EPDCCH region may be performed using various methods. Numbering of RB pairs used as the EPDCCH region is performed using a predefined rule. For example, the number of RB pair used as the EPDCCH region may be set in order from a low frequency RB pair in the EPDCCH region.

Meanwhile, a method in which the terminal 200 detects the EPDCCH notified of by the base station 100 is as follows. First, the terminal 200 recognizes the PRB pair of the EPDCCH region configured by the base station 100 as an RB pair used as the EPDCCH region. Then, the terminal 200 recognizes the EREGs constituting the ECCE in each RB pair used as the EPDCCH region. Then, the terminal 200 recognizes the ECCE based on the recognized EREG or resource element according to whether the EPDCCH has been subjected to localized mapping or distributed mapping. Further, the terminal 200 performs an EPDCCH detection process (blind decoding) based on the recognized ECCE.

Next, effects of the EREG configuration and the ECCE configuration described above will be described. The PDCCH, the cell-specific reference signal, the reference signal for channel state measurement, the terminal-specific reference signal, the broadcast channel, the synchronization signal, or the like is mapped to (multiplexed with) the resource element of the RB pair used as the EPDCCH region. In particular, in a case where the terminal-specific reference signal is used to detect (demodulate) the EPDCCH, some or all of the reference signals for EPDCCH demodulation of antenna ports 107 to 110 are mapped to (multiplexed with) the RB pair to which the EPDCCH is mapped. Further, the PDCCH, the cell-specific reference signal, the reference signal for channel state measurement, the broadcast channel, and the synchronization signal may not be mapped to the resource elements of the RB pair used as the EPDCCH region. Further, in one RB pair to which the EPDCCH is mapped, in a case where the reference signal for EPDCCH demodulation of CDM group 1 and CDM group 2 is used as illustrated in FIG. 4, the number of resource elements to which the EPDCCH can be mapped is 144 except for the resource element to which the reference signal for EPDCCH demodulation is mapped.

In the EREG and the EREG configured using the method described above, in a case where only the reference signals for EPDCCH demodulation of CDM group 1 and CDM group 2 are mapped, the number of resource elements constituting each EREG is 9 or 18. Further, in the ECCE configuration obtained based on the EREG configuration, in a case where only the reference signals for EPDCCH demodulation of CDM group 1 and CDM group 2 are mapped, the number of resource elements constituting each ECCE is 36. Here, the number of resource elements constituting the CCE used for the PDCCH is 36. The number of resource elements constituting the ECCE used for the EPDCCH is equal to the number of resource elements constituting the CCE used for the PDCCH. Therefore, for the EPDCCH, the same transmission method, reception method, signal processing and the like as those for the PDCCH may be used. That is, since the same transmission method, reception method, signal processing and the like for the PDCCH and the EPDCCH can be made common, loads of the base station 100 and the terminal 200 can be reduced.

Further, in the RB pair to which EPDCCH is mapped, in a case where the PDCCH and/or the cell-specific reference signal is mapped, the number of resource elements to which the EPDCCH can be mapped is reduced. Here, a variation of the number of resource elements between the ECCEs obtained based on the EREG configuration illustrated in FIG. 5 in a case where the number of resource elements to which the EPDCCH can be mapped is reduced will be described. First, in a case where the number of the antenna ports of the cell-specific reference signal is 1 (antenna port 0), a difference between a maximum value and a minimum value of the number of resource elements between ECCEs is 1 regardless of the number (0 to 3) of PDCCHs. Further, in a case where the number of antenna ports of the cell-specific reference signal is 2 (antenna ports 0 and 1), the difference between the maximum value and the minimum value of the number of resource elements between the ECCEs is 0 regardless of the number (0 to 3) of PDCCHs, and there is no variation of the number of resource elements between the ECCEs. Further, in a case where the number of antenna ports of the cell-specific reference signal is 4 (antenna ports 0 to 3), the difference between the maximum value and the minimum value of the number of resource elements between the ECCEs is 0 regardless of the number (0 to 3) of PDCCHs, and there is no variation of the number of resource elements between the ECCEs. That is, by using the EREG configuration illustrated in FIG. 5, the variation of the number of resource elements between ECCEs obtained based on the EREG configuration is suppressed regardless of a possible combination of the PDCCH region and the number of antenna ports of the cell-specific reference signal. Therefore, a size of the resources hardly changes according to the ECCE used for transmission of the EPDCCH. That is, a difference in transmission characteristics due to a coding gain for the EPDCCH is reduced according to the ECCE used for transmission of the EPDCCH. Accordingly, a load of a scheduling process when the base station 100 transmits the EPDCCH to the terminal 200 can be greatly reduced.

Further, in the case where the number of antenna ports of the cell-specific reference signal is 1 (antenna port 0), the number of antenna ports of the cell-specific reference signal can be considered to be 2 (antenna port 0 and 1) for the RB pair to which the EPDCCH is mapped. That is, in the case where the number of antenna ports of the cell-specific reference signal transmitted by the base station is 1 (antenna port 0), the base station 100 maps the EPDCCH on the assumption that the number of antenna ports of the cell-specific reference signal is 2 (antenna ports 0 and 1) when transmitting the EPDCCH to the terminal 200. In a case where the number of antenna ports of the cell-specific reference signal transmitted by the base station 100 is 1 (antenna port 0), the terminal 200 de-maps the EPDCCH on the assumption that the number of antenna ports of the cell-specific reference signal is 2 (antenna ports 0 and 1) when detecting the EPDCCH transmitted from the base station 100.

Hereinafter, association (mapping or correspondence) between resources used for transmission of the EPDCCH and the antenna port for the reference signal for EPDCCH demodulation will be described. As already described, the base station 100 transmits the EPDCCH and the reference signal for EPDCCH demodulation associated with that EPDCCH. Further, the terminal 200 detects (demodulates) the EPDCCH using the reference signal for EPDCCH demodulation. Resources used for transmission of the EPDCCH and the antenna port of the reference signal for EPDCCH demodulation are associated using a predetermined method. Here, the resources used for transmission of the EPDCCH include the EPDCCH region, the EPDCCH, the EREG, an EREG set, the ECCE, or resource elements. Further, the reference signal for EPDCCH demodulation is also simply referred to as a reference signal.

Further, the association between the resources used for transmission of the EPDCCH and the antenna port of the reference signal for EPDCCH demodulation can be switched based on the configuration regarding the EPDCCH. For example, the association of the resources used for transmission of the EPDCCH and the antenna port of the reference signal for EPDCCH demodulation can be different between a case in which the EPDCCH is transmitted through local mapping and a case in which the EPDCCH is transmitted through distributed mapping. That is, the association between the resources used for transmission of the EPDCCH and the antenna port of the reference signal for EPDCCH demodulation is determined according to whether the mapping rule configured in the EPDCCH region is local mapping or distributed mapping.

In a case where the EPDCCH is to be transmitted using local mapping, the antenna port to be associated with each EPDCCH is determined First, in each RB pair, each ECCE is associated with any one of antenna ports 107 to 110. For example, in each RB pair, antenna ports 107 to 110 are associated in an order from the ECCE with a small ECCE number. That is, each ECCE in the local mapping is associated with a different antenna port. Further, in a case where the ECCE aggregation level is 2 or more, each EPDCCH can be transmitted using any one of the antenna ports associated with the divided resources to be mapped. In this case, the association may be determined based on a terminal-specific ID, an RNTI, RB number, an RB pair number, and/or a slot number.

Further, the terminal 200 may be notified of the antenna port of the reference signal for EPDCCH demodulation for a candidate of the EPDCCH to be subjected to blind decoding, by the base station 100.

In a case where the EPDCCH is transmitted using distributed mapping, the antenna port to be associated with each resource element is determined. This association may be performed using various methods. Further, while a case in which antenna port 107 and antenna port 109 are used as the antenna port to be associated will be described in the following description, the present invention is not limited thereto. For example, antenna port 107 and antenna port 108 may be used as the antenna ports to be associated. The antenna port 107 is also referred to as a first antenna port. The antenna port 109 or antenna port 108 is also referred to as a second antenna port.

In an example of association between the resource element used for transmission of the EPDCCH and the antenna port of the reference signal for EPDCCH demodulation, antenna port 107 and antenna port 109 are alternately associated using a frequency-first mapping rule in each EREG.

Accordingly, in each EREG, the number of resource elements associated with antenna port 107 and the number of resource elements associated with antenna port 109 can be substantially the same. Since a deviation between the antenna ports can be reduced, effects of frequency diversity can be improved.

In another example of the association between the resource element used for transmission of the EPDCCH and the antenna port of the reference signal for EPDCCH demodulation, antenna port 107 and antenna port 109 are alternately associated using a frequency-first mapping rule in each EREG. Further, according to the EREG number associated EREG, association of the antenna ports, in each EREG, takes place from antenna port 107, or antenna port 109. For example, the association of the antenna ports is performed from antenna port 107 or antenna port 109 in each EREG according to whether the EREG number is an odd number or an even number.

That is, in the distributed mapping, the physical resources are given in units of EREGs. The respective resource elements in an EREG are alternately associated with one of the two antenna ports (that is, antenna ports 107 and 109). In this case, when the number of the EREG including the resource elements is an even number, the resource elements are associated sequentially from antenna port 107. In this case, when the number of the EREG including the resource elements is an odd number, the resource elements are associated sequentially from antenna port 109.

In the case of the EREG of which the EREG number is an even number, the association of the antenna ports is performed from antenna port 107 in each EREG. In the case of EREG of which the EREG number is an odd number, the association of the antenna ports is performed from antenna port 109 in each EREG. Accordingly, in each EREG, OFDM symbol, and RB pair, the number of resource elements associated with antenna port 107 may be substantially the same as the number of resource elements associated with antenna port 109. Since a deviation between the antenna ports can be reduced, effects of frequency diversity can be improved. Further, the averages of the transmission powers between the antenna ports are the same.

In another example of the association between the resource element used for transmission of the EPDCCH and the antenna port of the reference signal for EPDCCH demodulation, antenna port 107 and antenna port 109 are alternately associated using a frequency-first mapping rule in each EREG. Further, according to the EREG number of the associated EREG, the association of the antenna ports is performed from antenna port 107 or antenna port 109 in each EREG.

For example, the association of the antenna ports is performed from antenna port 107 or antenna port 109 based on a quotient obtained by dividing the EREG number by a predetermined number of M (that is, a result of applying a floor function to a number obtained by dividing the EREG number by M using 1 as a reference value) in each EREG.

For example, in a case where M is 4 and the quotient obtained by dividing the EREG number by 4 is an even number, the association of the antenna ports is performed from antenna port 107, and in a case where the quotient obtained by dividing the EREG number by 4 is an odd number, the association of the antenna port is performed from antenna port 109. That is, in the distributed mapping, the physical resources are given in units of EREGs. The respective resource elements in the EREG are alternately associated with one of the two antenna ports (that is, antenna ports 107 and 109). In this case, when the quotient obtained by dividing the EREG number including the resource elements by 4 is an even number, the resource elements are associated sequentially from antenna port 107. In this case, when the quotient obtained by dividing the EREG number including the resource elements by 4 (that is, a result of applying a floor function to a number obtained by dividing the EREG number by 4 using 1 as a reference value) is an odd number, the resource elements are associated sequentially from antenna port 109.

In a specific example, the association of the antenna ports is performed from antenna port 107 in a case where the EREG number is 0, 1, 2, 3, 8, 9, 10 or 11 in each EREG, and is performed from antenna port 109 in a case where the EREG the number is 4, 5, 6, 7, 12, 13, 14 and 15. That is, the association of the antenna ports is performed so that the deviations of the antenna ports associated with the EREGs constituting the ECCE are the same in the ECCE. Accordingly, in each EREG, OFDM symbol, RB pair, and ECCE, the number of resource elements associated with antenna port 107 can be substantially the same as the number of resource elements associated with antenna port 109. Since the deviation between the antenna ports can be reduced, effects of frequency diversity can be improved. Further, the averages of the transmission powers between the antenna ports are the same.

Further, while in the above description, the case in which antenna port 107 and antenna port 109 are alternately associated based on the EREG number in the association between the resource element used for transmission of the EPDCCH and the antenna port of the reference signal for EPDCCH demodulation has been described, the present invention is not limited thereto. For example, in the association between the resource element used for transmission of the EPDCCH and the antenna port of the reference signal for EPDCCH demodulation, antenna port 107 and antenna port 109 can be alternately associated based on the RB pair number, the ECCE number, a subframe number, the slot number, a number for identifying the EPDCCH region, and/or a number for identifying the EPDCCH.

While in the above description, the case in which antenna port 107 and antenna port 109 are alternately associated with each EREG in the association between the resource element used for transmission of the EPDCCH and the antenna port of the reference signal for EPDCCH demodulation has been described, the present invention is not limited thereto. For example, the resources on which the association between the resource element used for transmission of the EPDCCH and the antenna port of the reference signal for EPDCCH demodulation may be the RB pair, the ECCE, the subframe, the slot, the EPDCCH regions, and/or the EPDCCH.

In a specific example, another example of the association between the resource element used for transmission of the EPDCCH and the antenna port of the reference signal for EPDCCH demodulation, antenna port 107 and antenna port 109 may be alternately associated based on the RB pair number in each EREG using a frequency-first mapping rule. The association between the resource element used for transmission of the EPDCCH and the antenna port of the reference signal for EPDCCH demodulation is performed from antenna port 107 in each EREG in a case where the RB pair number is an even number, and is performed from antenna port 109 in each EREG in a case where the RB pair number is an odd number.

Further, in the association of the antenna ports described above, resource elements to which the collision signal is mapped may be excluded. That is, in the association of the antenna ports, in a case where the collision signal (an overwrite signal or an interrupt signal) is mapped to the resource elements in the EREG in which antenna port 107 and antenna port 109 are alternately (sequentially) associated, the resource element may be skipped and the antenna port may be associated with the resource element to be associated next. Here, the collision signal includes, for example, the cell-specific reference signal, the reference signal for channel state measurement, the terminal-specific reference signal, the broadcast channel, the synchronization signal, and/or the PDCCH region. Accordingly, in each EREG, OFDM symbol, RB pair, and/or ECCE, the number of resource elements associated with antenna port 107 is substantially the same as the number of resource elements associated with antenna port 109 irrespective of the collision signal.

Further, in another example, in a case where the reference signal for channel state measurement is mapped to the resource elements in the EREG in which the antenna ports are alternately (sequentially) associated, the resource element is not skipped and the antenna port is associated, and the resource element can be overwritten with the reference signal for channel state measurement. That is, the antenna port for the resource element to which the reference signal for channel state measurement is mapped is punctured. Accordingly, in a case where the EPDCCH region is shared among a plurality of terminals, the reference signal for channel state measurement that is configured to be specific to the terminal can be mapped.

Further, in a case where the collision signal is the PDCCH region, the terminal configures the PDCCH region based on a Control Field Indicator (CFI) notified of from the base station 100. In a case where the CFI is not configured through RRC signaling, the terminal recognizes the PDCCH region based on the CFI notified of through the PCFICH that is mapped to a predetermined resource element in the subframe. In a case where the CFI is configured through RRC signaling, the terminal recognizes the PDCCH region based on the CFI notified of through RRC signaling regardless of the CFI notified through the PCFICH. Further, in a case where the CFI is not configured through RRC signaling, the terminal may also recognize the PDCCH region based on a predefined CFI regardless of the CFI notified through PCFICH.

Further, while the case in which the association of the antenna ports is performed from antenna port 107 or from antenna port 109 based on the EREG number has been described, the present invention is not limited thereto. For example, the association of the antenna ports may be performed from antenna port 107 or from antenna port 109 based on the ECCE number, the EPDCCH number, the RB pair number, the cell ID, the RNTI or the like. Further, for example, the association of the antenna ports may be performed from antenna port 107 or from antenna port 109 based on a configuration from the base station 100.

Further, the association of the antenna ports may be fixed regardless of the collision signal. For example, in each subframe, the resource element of the even-numbered OFDM symbol is associated with antenna port 107, and the resource element of the odd-numbered OFDM symbol is associated with antenna port 109. Further, for example, in each subframe, the resource element of the odd-numbered OFDM symbol is associated with antenna port 107, and the resource element of the even-numbered OFDM symbol is associated with antenna port 109.

Further, an example of an operation of the EPDCCH generation unit that performs the association of the antenna ports described above will be described. The EPDCCH generation unit generates a control channel of which the terminal is notified, which is an EPDCCH associated with the first antenna port and the second antenna port. The EPDCCH generation unit maps the EPDCCH to the resource element included in the EREG assigned to transmission of the EPDCCH. The EPDCCH generation unit associates the first antenna port or the second antenna port with the resource element in each EREG using the frequency-first rule. The EPDCCH generation unit maps a complex symbol of the EPDCCH to the resource element associated with the first antenna port or the second antenna port, which is the resource element included in the EREG assigned to transmission of the EPDCCH.

Further, an example of an operation of the EPDCCH processing unit that performs detection of the EPDCCH on which the association of the antenna ports as described above has been performed will be described. The EPDCCH processing unit detects the EPDCCH mapped to the resource element included in the EREG assigned to the transmission of the EPDCCH and associated with the first antenna port and the second antenna port using the channel estimation value estimated by the channel estimation unit. The EPDCCH processing unit performs the detection on the assumption that the first antenna port and the second antenna port are alternately associated with the resource element in each EREG using the frequency-first rule. The EPDCCH processing unit performs the detection on the assumption that the complex symbol of the EPDCCH is mapped to the resource element associated with the first antenna port or the second antenna port, which is the resource element included in the EREG assigned to transmission of the EPDCCH.

Hereinafter, a search space (SS) that is a region for searching for the EPDCCH in the terminal 200 (blind decoding) will be described. The EPDCCH region (EPDCCH set) is configured by the base station 100, and the terminal 200 recognizes a plurality of ECCEs in the EPDCCH region. The number of ECCEs in the EPDCCH region is defined according to the number of RB pairs constituting the EPDCCH region and the number of EREGs constituting one ECCE. For example, in a case where one EPDCCH region includes two pairs RB and one ECCE includes four EREGs, the EPDCCH region includes eight ECCEs. Further, for example, in a case where one EPDCCH region includes eight RB pairs and one ECCE includes four EREGs, the EPDCCH region includes 32 ECCEs. Further, for example, in a case where one EPDCCH region includes eight RB pairs and one ECCE includes eight EREGs, the EPDCCH region includes 16 ECCEs. Further, in each ECCE, the EPDCCH region, the cell, the component carrier, the physical cell ID, the virtual cell ID, and/or an ECCE number specific to the terminal is defined.

For the terminal 200, the SS is configured by the base station 100. For example, for the terminal 200, the ECCE number recognized as the SS is configured by the base station 100. For example, for the terminal 200, one ECCE number that is a start ECCE number (a reference ECCE number) for recognition as the SS is configured by the base station 100. The terminal 200 recognizes the SS specific to the terminal 200 based on its start ECCE number and a predefined rule. Here, the start ECCE number is set based on the control information uniquely notified of from the base station 100 to the terminal 200. Further, the start ECCE number may be determined based on the RNTI that is uniquely configured from the base station 100 to the terminal 200. Further, the start ECCE number may be determined based on the control information uniquely notified from the base station 100 to the terminal 200 and the RNTI uniquely configured from the base station 100 to the terminal 200. Further, the start ECCE number may also be determined based on the subframe number numbered to each subframe and the slot number numbered to each slot. Accordingly, this start ECCE number is specific to the terminal 200, and is information specific to each subframe or each slot. Therefore, the SS of the terminal 200 may be configured to be different for each subframe or each slot. Further, various methods may be used for a rule for recognizing the SS from the start ECCE number.

The SS for searching for the EPDCCH in the terminal 200 may include one or more ECCEs. That is, the SS includes aggregation including one or more ECCEs (ECCE aggregation) in units of ECCEs within a region configured as the EPDCCH region. The number of ECCEs constituting this aggregation is referred to as an "ECCE aggregation level". Hereinafter, the ECCE aggregation level is also simply referred to as an aggregation level (AL). Further, the SS may be configured for each ECCE aggregation level. For example, the start ECCE for configuring the SS may be configured for each ECCE aggregation level.

The SS with each ECCE aggregation level includes aggregation of a plurality of the EPDCCH candidates. Further, the number of the EPDCCH candidates may be defined for each ECCE aggregation level. For example, in each ECCE aggregation level, the number of the EPDCCH candidates may be defined as 0 or more.

In a case where the ECCE aggregation level is 1 (AL1), the candidate of the EPDCCH includes one ECCE. In a case where the ECCE aggregation level is 2 (AL2), the candidates of the EPDCCH include aggregation of two ECCEs. In a case where the ECCE aggregation level is 4 (AL4), the candidates of the EPDCCH include aggregation of four ECCEs. In a case where the ECCE aggregation level is 8 (AL8), the candidates of EPDCCH include aggregation of eight ECCEs. In a case where the ECCE aggregation level is 16 (AL16), the candidates of the EPDCCH include aggregation of 16 ECCEs.

The base station 100 transmits the EPDCCH using one or more ECCEs in the ECCE which is configured in the terminal 200. The terminal 200 performs decoding of the reception signal using one or more ECCEs within the SS, and performs a process of detecting the EPDCCH destined for the terminal 200 (performs blind decoding). The terminal 200 configures an SS that is different for each ECCE aggregation level. Then, the terminal 200 performs blind decoding on ECCEs in a predetermined combination within the SS that is different for each ECCE aggregation level. In other words, the terminal 200 performs blind decoding on candidates of each EPDCCH within the SS that is independent for each ECCE aggregation level (monitors the EPDCCH).

Further, the combination of the EPDCCH candidate numbers (blind decoding numbers) for the ECCE aggregation level can be defined. The combination of the EPDCCH candidate numbers for the ECCE aggregation level is also referred to as a combination of the EPDCCH candidate numbers. In a case where the combination (AL1, AL2, AL4, AL8, and AL16) of the EPDCCH candidate numbers is represented by (8, 4, 2, 1, 0), the EPDCCH candidate number of AL1 is 8, the EPDCCH candidate number of AL2 is 4, the EPDCCH candidate number of AL4 is 2, the EPDCCH candidate number of AL8 is 1, and the EPDCCH candidate number of AL16 is 0.

The combination of the EPDCCH candidate numbers can be independently defined for each EPDCCH set. Further, a plurality of combinations of the EPDCCH candidate numbers may be defined and switched based on predetermined conditions. For example, the number of EPDCCH sets to be configured, a mapping rule of the EREG and the ECCE, the number of RB pairs constituting the EPDCCH set, a DCI format, the number of start symbols for the EPDCCH set, a type of a subframe in which the EPDCCH set is configured, a type of a cyclic prefix of resources in which the EPDCCH set is configured, and/or the number of resource elements available for mapping the EPDCCH in the RB pair in the EPDCCH set may be used as conditions that define the combination of the EPDCCH candidate numbers.

Here, the number of resource elements available for mapping the EPDCCH in the RB pair in the EPDCCH set is defined to be specific to the terminal 200. The resource element defined as the number of available resource elements satisfies the following criteria.

(1) The available resource element is a resource element of 16 EREGs in the RB pair.

(2) The available resource element is a resource element that is not used for the CRS, or CSI-RS set in the terminal 200.

(3) The available resource element satisfies that the OFDM symbol number in the first slot within the subframe is equal to or smaller than a predetermined number. Here, the predetermined number is set for each EPDCCH configured through PDCCH signaling and/or RRC signaling. That is, the available resource elements are resource elements from the OFDM symbol indicated by a start OFDM symbol that is a start OFDM symbol number within the subframe to a last OFDM symbol of the subframe. Further, the start OFDM symbol can be independently configured for each EPDCCH configured through PDCCH signaling and/or the RRC signaling.

A specific example of conditions that define the combination of the EPDCCH candidate numbers is defined based on the number of resource elements available for mapping the EPDCCH in each RB pair in the EPDCCH set.

For example, first conditions are conditions that a case in which the number of resource elements available for mapping the EPDCCH in each RB pair in the EPDCCH set is smaller than a predetermined value (threshold) (including equal to or smaller than the predetermined value) is to be satisfied. Second conditions are conditions that a case in which the number of resource elements available for mapping the EPDCCH in each RB pair in the EPDCCH set is greater than the predetermined value (threshold) (including equal to or greater than the predetermined value) is to be satisfied.

Further, the predetermined value used to switch between the first conditions and the second conditions can be defined in advance or can be configured by the base station. The predetermined value can be defined based on the reception quality for the EPDCCH when the resource elements are used. For example, the predetermined value may be 104.

Further, three or more conditions can be defined in advance or can be configured by the base station. In this case, the combinations of the EPDCCH candidate numbers are defined according to the number of the conditions.

Another specific example of conditions that define a combination of the EPDCCH candidate numbers is defined based on the number of resource elements available for mapping the EPDCCH in each RB pair in the EPDCCH set, the type of subframe to which the EPDCCH set is mapped, and the type of cyclic prefix (CP) of resources in which the EPDCCH set is configured.

For example, the first conditions are conditions that a case in which the number of resource elements available for mapping the EPDCCH in each RB pair in the EPDCCH set is smaller than a predetermined value (threshold) (including equal to or smaller than the predetermined value), a type of a subframe to which the EPDCCH set is mapped is a predetermined subframe, and a type of cyclic prefix of resources in which the EPDCCH set is configured is a normal CP is to be satisfied. The second conditions are conditions that non-inclusion in the first conditions is to be satisfied. For example, the second conditions are conditions that a case in which the number of resource elements available for mapping the EPDCCH in each RB pair in the EPDCCH set is greater than a predetermined value (threshold) (including equal to or greater than the predetermined value), a type of subframe to which the EPDCCH set is mapped is a subframe that is not included in the first conditions, and a type of cyclic prefix of resources in which the EPDCCH set is configured is an enhanced CP is to be satisfied.

The predetermined value used to switch between the first conditions and the second conditions can be defined in advance or can be set by the base station. The predetermined value can be defined based on the reception quality for the EPDCCH when the resource elements are used. For example, the predetermined value may be 104.

Further, three or more conditions are defined in advance or may be configured by the base station. In this case, the combinations of the EPDCCH candidate numbers are defined according to the number of the conditions.

Another specific example of conditions that define a combination of the EPDCCH candidate numbers is defined based on the number of resource elements available for mapping the EPDCCH in each RB pair in the EPDCCH set and the number of EREGs constituting one ECCE.

For example, the first conditions are conditions that a case in which the number of resource elements available for mapping the EPDCCH in each RB pair in the EPDCCH set is smaller than a predetermined value (threshold) (including equal to or smaller than the predetermined value), and one ECCE includes four EREGs is to be satisfied. The second conditions are conditions that a case in which non-inclusion in the first conditions is to be satisfied. For example, one of the second conditions is a condition that a case in which the number of resource elements available for mapping the EPDCCH in each RB pair in the EPDCCH set is greater than the predetermined value (threshold value) (including equal to greater than the predetermined value), and one of ECCE includes four EREGs is to be satisfied. Another condition of the second conditions is a condition that a case in which one ECCE includes eight EREGs is to be satisfied.

The predetermined value used to switch between the first conditions and the second conditions can be defined in advance or can be set by the base station. The predetermined value can be defined based on the reception quality for the EPDCCH when the resource elements are used. For example, the predetermined value may be 104.

Further, three or more conditions can be defined in advance or may be configured by the base station. In this case, the combination of the EPDCCH candidate numbers is defined according to the number of the conditions.

In the following description, the combinations of the EPDCCH candidate numbers are independently defined at least based on the number of resource elements available for mapping the EPDCCH in each RB pair in the EPDCCH set. For example, the first conditions are that the number of resource elements available for mapping the EPDCCH in each RB pair in the EPDCCH set is smaller than a predetermined value (threshold). The second conditions are that the number of resource elements available for mapping the EPDCCH in each RB pair in the EPDCCH set is greater than the predetermined value (threshold).

However, as already described, the combination of the EPDCCH candidate numbers can be defined based on various conditions other than the conditions regarding the number of resource elements available to map the EPDCCH in each RB pair in the EPDCCH set. The conditions for defining the combination of the EPDCCH candidate numbers may be used alone or in combination of a plurality of conditions.

FIG. 7 is a diagram illustrating an example of combinations of the EPDCCH candidate numbers in a case where one EPDCCH set is configured. In the example of FIG. 7, the combinations of the EPDCCH candidate numbers are independently defined for the number N of the RB pairs constituting the EPDCCH set, and conditions for the EPDCCH set. For example, in a case where the number N of the RB pairs constituting the EPDCCH set is 4 and the conditions for the EPDCCH set are the second conditions, the combination of the EPDCCH candidate numbers is (4, 6, 3, 2, 1).

FIGS. 8 to 11 are diagrams illustrating an example of combinations of the EPDCCH candidate numbers in a case where two EPDCCH sets are configured. In the example of FIGS. 8 to 11, the combinations of the EPDCCH candidate numbers are independently defined based on the numbers $N_1$ and $N_2$ of the RB pairs constituting the first EPDCCH set and the second EPDCCH set, and conditions for the first EPDCCH set and the second EPDCCH.

FIG. 8 is a diagram illustrating an example of combinations of the EPDCCH candidate numbers in a case where the first EPDCCH set corresponds to the first conditions, and the second EPDCCH set corresponds to first conditions. FIG. 9 is a diagram illustrating an example of combinations of the EPDCCH candidate numbers in a case where the first EPDCCH set is the first conditions, and the second EPDCCH set is the second conditions. FIG. 10 is a diagram illustrating an example of combinations of the EPDCCH candidate numbers in a case where the first EPDCCH set is the second conditions, and the second EPDCCH set is the first condition. FIG. 11 is a diagram illustrating an example of combinations of the EPDCCH candidate numbers in a case where the first EPDCCH set is the second conditions, and the second EPDCCH set is the second conditions.

That is, in the example illustrated in FIGS. 8 to 11, the combinations of the EPDCCH candidate numbers are independently defined based on the conditions for the first EPDCCH set and the conditions for the second EPDCCH set.

Hereinafter, effects of the combinations of the EPDCCH candidate numbers being independently defined based on the conditions for the first EPDCCH set and the conditions for the second EPDCCH set as illustrated in FIGS. 8 to 11 will be described.

As already described, resources to which the EPDCCH can be mapped can be independently set for each EPDCCH set. That is, the number of resource elements available for mapping the EPDCCH in each RB pair in the EPDCCH set may be independent in each EPDCCH set and may be different for each EPDCCH set. In particular, the number of resource elements available for mapping the EPDCCH in each RB pair in the EPDCCH set may greatly depend on the start OFDM symbols for each RB pair in the EPDCCH set. Further, the start OFDM symbol can be independently set for each EPDCCH set. Therefore, the EPDCCH set corresponding to the first conditions and the EPDCCH set corresponding to the second condition are likely to both exist.

However, when the combinations of the EPDCCH candidate numbers are independently defined based on the conditions for the first EPDCCH set and the conditions for the second EPDCCH set, preferable combinations of the EPDCCH candidate numbers are applicable according to the conditions corresponding to the respective EPDCCH sets. For example, as illustrated in FIGS. 8 to 11, when each of the first EPDCCH set and the second EPDCCH set corresponds to the first conditions or the second conditions, there are four states. Specifically, a first state is a state in which the first EPDCCH set corresponds to the first conditions, and the second EPDCCH set corresponds to the first conditions. A second state is a state in which the first EPDCCH set corresponds to the first conditions, and the second EPDCCH set corresponds to the second conditions. A third state is a state in which the first EPDCCH set corresponds to the second conditions, and the second EPDCCH set corresponds to the first condition. A fourth conditions are a state in which the first EPDCCH set corresponds to the second conditions, and the second EPDCCH set corresponds to the second conditions. That is, since the combinations of the EPDCCH candidate numbers are independently defined for the four states that are combinations of the conditions for each of the first EPDCCH set and the second EPDCCH set, the combinations of the EPDCCH candidate numbers can be appropriately applied according to the conditions. Further, the combination of the EPDCCH candidate numbers can be appropriately applied according to the number of resource elements available in the first EPDCCH set and the second EPDCCH set. In a case where a total number of the EPDCCH candidate number for the first EPDCCH set and the EPDCCH candidate number for the second EPDCCH set is limited, the above-described method is more effective.

Further, even in the case where the two EPDCCH sets are configured, the combination of the EPDCCH candidate numbers in the first EPDCCH set and the second EPDCCH set may be independently defined using the combination of the EPDCCH candidate numbers illustrated in FIG. 7. Accordingly, since the number that defines the combinations of the EPDCCH candidate numbers is reduced, the storage capacity in the base station 100 and the terminal 200 can be reduced.

Hereinafter, a resource position of the EPDCCH candidate will be described. Here, the resource location of the EPDCCH candidates is one or more ECCEs to which the EPDCCH can be mapped. For example, the resource location of the EPDCCH candidate can be indicated by an ECCE number that is an index indicating the ECCE. Further, the ECCE number is a number that is defined by the number of RB pairs constituting the EPDCCH set and is specific to each EPDCCH set or a plurality of EPDCCH sets.

The resource location of the EPDCCH candidate in local mapping and the resource location of the EPDCCH candidate in distributed mapping can be independently defined. The resource location of the EPDCCH candidate can be defined based on a combination of the EPDCCH candidate numbers for the EPDCCH set. For example, the resource location of the EPDCCH candidate can be defined based on the number of the EPDCCH candidates and the number of RB pairs constituting the EPDCCH set. Further, the resource location of the EPDCCH candidate can also be defined based on a start ECCE specific to the terminal 200. The start ECCE can be configured based on the control information notified of by the base station 100. Further, the start ECCE can be configured based on the control information specific to the terminal 200. For example, the start ECCE can be configured based on the RNTI that is an identifier specific to the terminal 200.

For example, the resource location of the EPDCCH candidate can be defined by the ECCE identified or set in a predetermined order or method from the start ECCE. For example, in the case where the ECCE aggregation level is 2 or greater, the resource location of the EPDCCH candidates can be defined by the ECCEs having consecutive ECCE numbers according to the ECCE aggregation level. Further, for example, in the case of local mapping, the resource location of the EPDCCH candidates can be defined by the ECCEs in the RB pairs in which the respective EPDCCH candidates are different. For example, in the case of distributed mapping, the resource locations of the EPDCCH candidates can be defined by the ECCEs having the consecutive ECCE numbers for the respective EPDCCH candidates.

The base station 100 sets one or more EPDCCH sets for the terminal 200. The base station 100 maps the EPDCCH for the terminal 200 to any one of the EPDCCH candidates in the EPDCCH set that has been set. The EPDCCH candidates in the EPDCCH set is identified using the methods already described.

For the terminal 200, one or more EPDCCH sets are configured by the base station 100. The terminal 200 sets or recognizes the EPDCCH candidate number and/or the resource position of the EPDCCH candidate of each ECCE aggregation level using the method that has already been described. For example, the terminal 200 sets or recognizes the EPDCCH candidate number and/or the resource position of the EPDCCH candidate of each ECCE aggregation level based on information for the EPDCCH set that has been set and/or the conditions for the EPDCCH set. The terminal 200 performs sequential search (blind decoding) of the EPDCCH on the EPDCCH candidates.

Here, the control information is subjected to, for example, an error detection coding process and is mapped to the PDCCH and/or EPDCCH that is a physical control channel. The PDCCH and the EPDCCH are subjected to an error correction coding process or a modulation process, and are transmitted and received through the PDCCH region and the EPDCCH region different from the PDCCH. However, the physical control channel stated herein is a type of physical channel, and is a control channel defined on the physical frame.

Further, when viewed from one viewpoint, the PDCCH is a physical control channel that uses the same transmission port (antenna port) as a cell-specific reference signal. Further, the EPDCCH is a physical control channel that uses the same transmission port as a reference signal for EPDCCH demodulation. The terminal 200 demodulates the PDCCH using the cell-specific reference signal, and demodulates the EPDCCH using the reference signal for EPDCCH demodulation. The cell-specific reference signal is a reference signal common to all the terminals in the cell, and is a reference signal that is available to any terminal since the reference signal is inserted into substantially all resources. Therefore, the PDCCH can be demodulated by any terminal. On the other hand, the reference signal for EPDCCH demodulation is a reference signal inserted only in the allocated resources, and can be subjected to an adaptive precoding process or beam forming process, similarly to data. With the control channel arranged in the EPDCCH region in this case, a gain of adaptive precoding or beamforming and a frequency scheduling gain can be obtained. Further, the reference signal for EPDCCH demodulation can also be shared by a plurality of terminals. For example, in a case where the control channel arranged in the EPDCCH region is distributed to a plurality of resources (for example, resource blocks) and notified of, the terminal-specific reference signal of the EPDCCH region can be shared by the plurality of terminals. With the control channel arranged in the EPDCCH region in this case, a frequency diversity gain can be obtained.

Further, when viewed from a different viewpoint, the control channel (PDCCH) mapped to the PDCCH region is a physical control channel on the OFDM symbol (symbol) located in a front portion of the physical subframe, and may be arranged in the entire system band (component carrier (CC)) on the OFDM symbols. Further, the control channel (EPDCCH) mapped to the EPDCCH region is a physical control channel on the OFDM symbols located after the PDCCH of the physical subframe, and may be arranged in a partial band within the system bandwidth on the OFDM symbols. Since the PDCCH is arranged on the OFDM symbols dedicated to the control channel located in the front portion of the physical subframe, the PDCCH can be received and demodulated before the OFDM symbols in a rear portion for the physical data channel. Further, a terminal that monitors only the OFDM symbol dedicated to the control channel can also receive the PDCCH. Further, since this can be distributed and arranged in the entire CC region, inter-cell interference can be randomized. Further, the PDCCH region is a region set to be specific to the base station 100, and is a region common to all terminals connected to the base station 100. On the other hand, the EPDCCH is arranged on the OFDM symbol in the rear portion for a shared channel (physical data channel) normally received by the communicating terminal. Further, using the frequency division multiplexing, the EPDCCHs or the EPDCCH and the physical data channel may be orthogonally multiplexed (multiplexed without interference). Further, the EPDCCH region is a region set to be specific to the terminal 200, and is a region set for each terminal to be connected to the base station 100. Further, the base station 100 can set the EPDCCH region to be shared among a plurality of terminals. Further, the PDCCH region and the EPDCCH region are arranged in the same physical subframe. Here, the OFDM symbol is a unit in a time direction for mapping bits of each channel.

Further, when viewed from a different viewpoint, the PDCCH is a cell-specific physical control channel and is a physical channel that can be acquired (detected) by both a terminal in an idle state and a terminal in a connection state. Further, the EPDCCH is a terminal-specific physical control channel, and is a physical channel that can be acquired by only the terminal in a connection state. Here, the idle state is a state in which data transmission and reception is not immediately performed, such as a state in which the base station does not accumulate Radio Resource Control (RRC) information (RRC_IDLE state) or a state in which the mobile station performs intermittent reception (DRX). On the other hand, the connection state is a state in which data transmission and reception can be immediately performed, such as a state in which the terminal holds information regarding a network (RRC_CONNECTED state) or a state in which the mobile station does not perform intermittent reception (DRX). The PDCCH is a channel that can be received by the terminal 200 without depending on terminal-specific RRC signaling. The EPDCCH is a channel which is configured by terminal-specific RRC signaling, and is a channel that can be received by the terminal 200 through the terminal-specific RRC signaling. That is, the PDCCH is a channel that can be received by any terminal through a previously limited setting, and the EPDCCH is a channel in which a terminal-specific setting is easily changed.

As described above, in the case where the base station 100 sets the EPDCCH for the terminal 200, the base station 100 includes the terminal-specific setting information of the EPDCCH in the terminal-specific setting information for radio resources through dedicated RRC signaling, and notifies of the information. Further, in the case where the base station 100 changes the set EPDCCH for the terminal 200, the base station 100 similarly notifies of the terminal-specific setting information for radio resources including the terminal-specific setting information of the EPDCCH in which parameters have been changed through dedicated RRC signaling. Further, in the case where the base station 100 releases the set EPDCCH for the terminal 200, the base station 100 similarly performs notification through the dedicated RRC signaling. For example, the base station 100 notifies of the terminal-specific setting information for radio resources that do not include the terminal-specific setting information of the EPDCCH. Further, the base station 100 may notify of the control information for releasing the terminal-specific setting information of the EPDCCH.

Second Embodiment

Hereinafter, an embodiment of the present invention will be described. A communication system in this embodiment includes a base station and a terminal described in the first embodiment. Hereinafter, a difference from the first embodiment will be described.

In the first embodiment, the combination of the EPDCCH candidate numbers in the case where the two EPDCCH sets are configured is independently defined based on the numbers $N_1$ and $N_2$ of the respective RB pairs constituting the first EPDCCH set and the second EPDCCH set, and the conditions for each of the first EPDCCH set and the second EPDCCH set, as in the example illustrated in FIGS. 8 to 11. That is, there are four states according to whether each of the first EPDCCH set and the second EPDCCH set correspond to the first conditions or the second conditions. Specifically, the first state is a state in which the first EPDCCH set has the first conditions, and the second EPDCCH set has the first conditions. The second state is a state in which the first EPDCCH set has the first conditions, and the second EPDCCH set has the second conditions. The third state is a state in which the first EPDCCH set has the second conditions, and the second EPDCCH set has the first conditions. The fourth state is a state in which the first EPDCCH set has the second conditions, and the second EPDCCH set has the second conditions. The combinations of the EPDCCH candidate numbers are independently defined for the respective states.

In the present embodiment, even in the case where the conditions for the first EPDCCH set and the conditions for the second EPDCCH set are different, the combination of the EPDCCH candidate numbers in the case where the conditions for the first EPDCCH set and the conditions for the second EPDCCH set are the same is used as the combination of the EPDCCH candidate numbers.

FIG. 12 is a diagram illustrating an example of a combination of the EPDCCH candidate numbers in a case where two EPDCCH set are configured. In the example of FIG. 12, the combination of the EPDCCH candidate numbers can be defined based on the numbers $N_1$ and $N_2$ of the respective RB pairs constituting the first EPDCCH set and the second EPDCCH set, and two states of conditions for the first EPDCCH set and the second EPDCCH set. The two states of conditions for the first EPDCCH set and the second EPDCCH set are a case in which at least one of the first EPDCCH set and the second EPDCCH set corresponds to the first conditions, and a case in which the first EPDCCH set and the second EPDCCH set correspond to the second conditions. That is, the combination of the EPDCCH candidate numbers in the case where the conditions for the first EPDCCH set and the conditions for the second EPDCCH set are different is the same as the combination of the EPDCCH candidate numbers in the case where the first EPDCCH set and the second EPDCCH set correspond to the first conditions.

Accordingly, since the number that defines the combination of the EPDCCH candidate numbers is reduced, the storage capacity in the base station 100 and the terminal 200 can be reduced. Further, in a case where the reception quality in the first conditions is lower than the reception quality in the second conditions, since the combination of the EPDCCH candidate numbers in the case where both of the EPDCCH sets correspond to the first conditions is used in the case where the other EPDCCH set corresponds to the first conditions even when one EPDCCH set corresponds to the second conditions, the combination of the EPDCCH candidate numbers is tailored for the side in which reception quality is low.

Here, the reception quality in the first conditions or the second conditions may be estimated based on the number of resource elements that can be used to transmit the EPDCCH.

Further, the two states of conditions for the first EPDCCH set and the second EPDCCH set may be a case in which the first EPDCCH set and the second EPDCCH set correspond to the first conditions, and a case in which at least one of the first EPDCCH set and the second EPDCCH set corresponds to the second conditions. That is, the combination of the EPDCCH candidate numbers in the case where the conditions for the first EPDCCH set and the conditions for the second EPDCCH set are different is the same as the combination of the EPDCCH candidate numbers in the case where the first EPDCCH set and the second EPDCCH set correspond to the second conditions.

Accordingly, since the number that defines the combination of the EPDCCH candidate numbers is reduced, the storage capacity in the base station 100 and the terminal 200 can be reduced. Further, in the case where the reception quality in the first conditions is lower than the reception quality in the second conditions, since the combination of the EPDCCH candidate numbers in the case where both of the EPDCCH sets correspond to the second conditions is used in the case where the other EPDCCH set corresponds to the second conditions even when one EPDCCH set corresponds to the first conditions, the combination of the EPDCCH candidate numbers is tailored for the side in which reception quality is high.

FIG. 13 is a diagram illustrating an example of a combination of the EPDCCH candidate numbers in a case where two EPDCCH sets are configured. In the example of FIG. 13, the combination of the EPDCCH candidate numbers can be defined based on the numbers $N_1$ and $N_2$ of the respective RB pairs constituting the first EPDCCH set and the second EPDCCH set, and two states of conditions for the first EPDCCH set and the second EPDCCH set. The two states of conditions for the first EPDCCH set and the second EPDCCH set may be a case in which the first EPDCCH set corresponds to the first conditions, and a case in which the first EPDCCH set corresponds to the second conditions. That is, the combinations of the EPDCCH candidate numbers in the first EPDCCH set and the second EPDCCH set are defined according to the condition of the first EPDCCH set regardless of the conditions for the second EPDCCH set.

Accordingly, since the number that defines the combinations of the EPDCCH candidate numbers is reduced, the storage capacity in the base station 100 and the terminal 200 can be reduced. Further, in the case where a degree of importance or priority is different between the first EPDCCH set and the second EPDCCH set, the combination of the EPDCCH candidate numbers can be preferably defined according to the degree of importance or priority.

Further, the combinations of the EPDCCH candidate numbers in the first EPDCCH set and the second EPDCCH set may be defined according to the condition of the second EPDCCH set regardless of the conditions for the first EPDCCH set.

Further, the two states of the conditions for the first EPDCCH set and the second EPDCCH set may be states in which the respective EPDCCH sets are based on the setting of the distributed mapping or the local mapping. For example, the two states of conditions for the first EPDCCH set and the second EPDCCH set are a case in which at least one of the first EPDCCH set and the second EPDCCH set corresponds to distributed mapping, and a case in which the first EPDCCH set and the second EPDCCH set correspond to local mapping. Further, for example, the two states of conditions for the first EPDCCH set and the second EPDCCH set are a case in which at least one of the first EPDCCH set and the second EPDCCH set corresponds to local mapping, and a case in which the first EPDCCH set and the second EPDCCH set correspond to distributed mapping. Further, for example, the combinations of the EPDCCH candidate numbers in the first EPDCCH set and the second EPDCCH set may be defined according to the setting of distributed mapping or local mapping for the first EPDCCH set regardless of the setting of distributed mapping or local mapping for the second EPDCCH set.

Further, the combinations of the EPDCCH candidate numbers in the first EPDCCH set and the second EPDCCH sets can be defined based on the first conditions or the second conditions, in addition to the setting of the distributed mapping or the local mapping for the EPDCCH set.

Accordingly, since the number that defines the combinations of the EPDCCH candidate numbers is reduced, the storage capacity in the base station 100 and the terminal 200 can be reduced. The combinations of the EPDCCH candidate numbers in the first EPDCCH set and the second EPDCCH set can be appropriately defined based on the setting of the distributed mapping or the local mapping for the EPDCCH set.

As already described, in the case where the conditions for the first EPDCCH set and the second EPDCCH set are the first conditions or the second conditions, combinations taken by them include four states. In the present embodiment, since the four states can be treated as two states, the number defining the combinations of the EPDCCH candidate numbers is reduced. Accordingly, the storage capacity is reduced in the base station 100 and the terminal 200, and thus, it is possible to reduce the process.

Further, states of the conditions for the first EPDCCH set and the second EPDCCH set may be three states. For example, the three states of the conditions for the first EPDCCH set and the second EPDCCH set include a case in which the first EPDCCH set and the second EPDCCH set correspond to first conditions, a case in which the first EPDCCH set and the second case EPDCCH set correspond to second conditions, and a case in which the conditions for the first EPDCCH set and the condition for the second EPDCCH set are different. Further, for example, the three states of the conditions for the first EPDCCH set and the second EPDCCH set include a case in which the first EPDCCH set corresponds to the first conditions regardless of the conditions for the second EPDCCH set, a case in which the first EPDCCH set corresponds to the second conditions and the second EPDCCH set corresponds to the first conditions, and a case in which conditions for the first EPDCCH set and the second EPDCCH set correspond to the second conditions.

Further, the three states of the conditions for the first EPDCCH set and the second EPDCCH set may be states in which the respective EPDCCH sets are based on the setting of the distributed mapping or the local mapping.

Accordingly, in the case where the conditions for the first EPDCCH set and the second EPDCCH set correspond to the first conditions or the second conditions, four states that are combinations that can be taken by the conditions can be treated as three states, and thus, the number defining the combination of the EPDCCH candidate numbers can be reduced. Accordingly, the storage capacity can be reduced in the base station 100 and the terminal 200.

Further, in each of the above embodiments, the association of the antenna ports in the distributed mapping may be performed on each of the blocks of complex symbols. The block of the complex symbols may be all or some of the EPDCCHs.

The association of the antenna ports is performed on the complex symbol of the EPDCCH. The complex symbol is mapped to the resource element in each EREG using the frequency-first mapping rule. Mapping of the complex symbol to the resource element is performed on the resource element to which the collision signal is not mapped. As a result, the antenna port can be associated with the collision signal skipped.

Therefore, the same effects as those in the case where the association of the antenna ports is performed on the resource elements are obtained. That is, in each EREG, OFDM symbol, RB pair, and ECCE, the number of resource elements associated with antenna port 107 can be substantially the same as the number of resource elements associated with antenna port 109. Since a deviation between the antenna ports can be reduced, effects of frequency diversity can be improved. Further, the averages of the transmission power between the antenna ports are the same.

Further, the case in which the EREG number is assigned to each RB pair has been described in each of the above embodiments, but the present invention is not limited thereto. For example, the present invention is applicable even in a case where the EREG number is allocated with all the RB pairs in the EPDCCH region skipped. For example, in the case where the EPDCCH region includes four RB pairs, each RB pair constitutes 16 EREGs, and thus, the EPDCCH region includes 64 EREGs. In this case, the EREG number can be 0 to 63, and assigned sequentially from the RB pair at lower frequency. That is, the EREG number in the first RB pair is 0 to 15, the EREG number in the second RB pair is 16 to 31, the EREG number in the third RB pair is 32 to 47, and the EREG number in the fourth RB pair is 48 to 63.

Further, in each of the above embodiments, the case in which the frequency-first mapping rule is used has been described, but the present invention is not limited thereto. That is, a time-first mapping rule may be used. The time-first mapping rule is a rule in which the mapping targets are first mapped to resource elements of the OFDM symbols in a time delay direction in the respective subcarriers sequentially from a resource element of a subcarrier at a lowest frequency that is a first OFDM symbol among a plurality of resource elements in the mapping region, and then, the same mapping is performed on the subcarriers in a direction in which the frequency increases. Further, since mapping in the time-first mapping rule can also be applied to association of antenna ports or the like, the mapping can be replaced with the association. That is, the time-first mapping rule may be replaced with a time-first association rule. Further, the time-first mapping rule and the time-first association rule are also referred to as a time-first rule.

Further, in each of the above embodiments, the case in which the antenna port 107 and the antenna port 109 are alternately associated with the resource elements or the complex symbols of the EPDCCH in the respective EREGs according to a predetermined rule has been described, but the present invention is not limited thereto. For example, the effects of the present invention are obtained when a difference between the number of the resource elements or the complex symbols of the EPDCCH associated with the antenna port 107 in the respective EREGs and the number of the resource elements or the complex symbols of the EPDCCH associated with the antenna port 109 is smaller. Therefore, in the respective EREGs, the association of the antenna port and the resource element or the complex symbols of the EPDCCH may be performed to be 1 or 0 between the antenna port 107 and the antenna port 109. In one specific example, in a case where the antenna port 107 and the antenna port 109 are associated with nine resource elements or complex symbols of the EPDCCH, five antenna ports 107 and four antenna ports 109 are sequentially associated according to a predetermined rule.

Further, in each of the above embodiments, the description has been given using the subframe or a radio frame as a transmission unit in the time direction using the resource element or the resource block as a mapping unit of the data channel, the control channel, the PDSCH, the PDCCH, the EPDCCH, and the reference signal, but the present invention is not limited thereto. The same effects can be obtained even when a region and a time unit including any frequency and time is used instead.

Further, the enhanced physical downlink control channel 103 arranged in the PDSCH region is referred to as the EPDCCH to clarify distinction from a conventional physical downlink control channel (PDCCH) in each of the above embodiments, but the present invention is not limited thereto. Even in the case where both are referred to as the PDCCH, if different operations are performed in the enhanced physical downlink control channel arranged in the PDSCH region and the conventional physical downlink control channel arranged in the PDCCH region, this is substantially the same as each of the embodiments in which the EPDCCH and the PDCCH are distinguished from each other.

Further, when the terminal 200 starts communication with the base station 100, the base station 100 is notified of information indicating whether the functions described in each of the above embodiments are available (terminal capability information or functionality group information), and thus, the base station 100 can determine whether the functions described in each of the above embodiments are available. More specifically, in a case where the functions described in each of the above embodiments are available, information indicating this fact may be included in the terminal capability information, and in a case where the functions described in each of the above embodiments are not available, information regarding this function may not be included in the terminal capability information. Alternatively, in the case where the functions described in each of the above embodiments are available, 1 is set in a predetermined bit field of function group information, and in the case where the functions described in each of the above embodiments are not available, 0 is set in predetermined bit field of the function group information.

Further, in each of the above embodiments, the description has been given using the subframe or the radio frame as a transmission unit in the time direction using the resource element or the resource block as a mapping unit of the data channel, the control channel, the PDSCH, the PDCCH, the EPDCCH, and the reference signal, but the present invention is not limited thereto. The same effects can be obtained even when a region and a time unit including any frequency and time is used instead. In each of the above embodiments, a case in which demodulation is performed using the RS subjected to the precoding process has been described and the description has been given using a port equivalent to an MIMO layer as a port corresponding to the RS subjected to the precoding process, but the present invention is not limited thereto. Further, the same effects can be obtained by applying the present invention to the port corresponding to different reference signals. For example, using an unprecoded RS rather than the precoded RS, a port equivalent to an output end after the precoding process or a port equivalent to a physical antenna (or a combination of physical antennas) can be used as the port.

A program operating in the base station 100 and the terminal 200 according to the present invention is a program that controls a CPU or the like (a program that causes a computer to function) so as to realize the functions of the above-described embodiments according to the present invention. Also, the information handled in the devices is temporarily stored in a RAM during processing, and then, stored in various ROMs or HDDs, is read by the CPU as necessary, or modified and written. A recording medium that stores the program may be any one of a semiconductor medium (for example, a ROM or a nonvolatile memory card), an optical recording medium (for example, a DVD, an MO, an MD, a CD, or a BD), and a magnetic recording medium (for example, a magnetic tape or a flexible disk). Further, the functions of the above-described embodiments may be realized by executing a loaded program, and the function of the invention may be realized by performing a process in cooperation with an operating system or other application programs based on instructions of the program.

Further, for the distribution on the market, the program can be stored in a portable recording medium for distribution, or can be transferred to a server computer connected over a network such as the Internet. In this case, a storage device of the server computer is also included in the present invention. Further, a part or all of the base station 100 or the terminal 200 in the above-described embodiments may be typically implemented as an LSI that is an integrated circuit. The respective functional blocks of the base station 100 and the terminal 200 may be individually made as chips, or some or all of the functional blocks may be integrated as a chip. Further, an integrated circuit scheme is not limited to an LSI and may be realized by a dedicated circuit or a general-purpose processor. Further, in a case where an integrated circuit technology for an LSI has emerged with the advancement of a semiconductor technology, an integrated circuit according to the technology can be used.

Further, the present invention is not limited to the above-described embodiments. The terminal apparatus of the present invention is not limited to application to a mobile station apparatus, and is applicable to stationary electronic devices installed indoors or outdoors or non-movable electronic devices, such as AV devices, kitchen devices, cleaning and washing devices, air-conditioning devices, office devices, vending machines, or other lifestyle devices.

While the embodiments of the present invention have been described in detail with reference to the drawings, a specific configuration is not limited to the embodiments, and design modifications without departing from the gist of the invention are also included. For example, among a series of processes, the design modification may be performed such that an order of some of the processes is reverse. Further, various changes of the present invention can be performed within the scope shown in the claims, and embodiments obtained by appropriately combining the technical means disclosed in different embodiments are within the technical scope of the present invention. Further, a configuration in which the elements described in the above embodiments and achieving the same effects are replaced with each other is also included.

INDUSTRIAL APPLICABILITY

The present invention is preferably used for the wireless base station apparatus, a wireless terminal apparatus, a wireless communication system, or a wireless communication method.

(1) The present invention has been made to solve the above-described problems. A base station according to an aspect of the invention is a base station that communicates with a terminal using a resource element including one subcarrier and one OFDM symbol, and an RB pair including predetermined resource elements, in which the base station includes an EPDCCH generation unit that maps an EPDCCH used to notify of control information for the terminal to any one of the candidates of the EPDCCH respectively defined for a first EPDCCH set and a second EPDCCH set, which include a plurality of RB pairs, a number of EPDCCH candidates is defined based on a number of RB pairs constituting the first EPDCCH set, a number of RB pairs constituting the second EPDCCH set, conditions for the first EPDCCH set, and conditions for the second EPDCCH set, and the conditions are either first conditions or second conditions different from the first conditions.

(2) The base station according to an aspect of the present invention is the above base station, in which the first conditions are conditions that a case in which the number of resource elements to which the EPDCCH in the RB pair can be mapped is smaller than a predetermined number is satisfied, and the second conditions are conditions that a case in which the number of resource elements to which the EPDCCH in the RB pair can be mapped is equal to greater than a predetermined number is satisfied.

(3) The base station according to an aspect of the present invention is the above base station, in which the first conditions are conditions that a case in which the number of resource elements to which the EPDCCH in the RB pair can be mapped is smaller than a predetermined number, and one ECCE includes four EREGs is satisfied, and the second conditions are conditions that a case in which the number of resource elements to which the EPDCCH in the RB pair can be mapped is equal to greater than a predetermined number, and one ECCE includes four EREGs or a case in which one ECCE includes eight EREGs is satisfied.

(4) The base station according to an aspect of the present invention is the above base station, in which the number of EPDCCH candidates is independently defined for a case in which the first EPDCCH set and the second EPDCCH set correspond to the first conditions, a case in which the first EPDCCH set corresponds to the first conditions and the second EPDCCH set corresponds to the second conditions, a case in which the first EPDCCH set corresponds to the second conditions and the second EPDCCH set corresponds to the first conditions, and a case in which the first EPDCCH set and the second EPDCCH set correspond to the second conditions.

(5) The base station according to an aspect of the present invention is the above base station, in which the number of EPDCCH candidates is independently defined for a case in which at least one of the first EPDCCH set and the second EPDCCH set corresponds to the first conditions, and a case in which the first EPDCCH set and the second EPDCCH set correspond to the second conditions.

(6) A terminal according to an aspect of the present invention is a terminal that communicates with a base station using a resource element including one subcarrier and one OFDM symbol, and an RB pair including predetermined resource elements, in which the terminal includes an EPDCCH processing unit that searches for an EPDCCH used to notify of control information for the terminal from the candidates of the EPDCCH respectively defined for a first EPDCCH set and a second EPDCCH set, which include a plurality of RB pairs, a number of EPDCCH candidates is defined based on a number of RB pairs constituting the first EPDCCH set, a number of RB pairs constituting the second EPDCCH set, conditions for the first EPDCCH set, and conditions for the second EPDCCH set, and the conditions are either first conditions or second conditions different from the first conditions.

(7) The terminal according to an aspect of the present invention is the above terminal, in which the first conditions are conditions that a case in which the number of resource elements to which the EPDCCH in the RB pair can be mapped is smaller than a predetermined number is satisfied, and the second conditions are conditions that a case in which the number of resource elements to which the EPDCCH in the RB pair can be mapped is equal to greater than a predetermined number is satisfied.

(8) The terminal according to an aspect of the present invention is the above terminal, in which the first conditions are conditions that a case in which the number of resource elements to which the EPDCCH in the RB pair can be mapped is smaller than a predetermined number, and one ECCE includes four EREGs is satisfied, and the second conditions are conditions that a case in which the number of resource elements to which the EPDCCH in the RB pair can be mapped is equal to greater than a predetermined number, and one ECCE includes four EREGs or a case in which one ECCE includes eight EREGs is satisfied.

(9) The terminal according to an aspect of the present invention is the above terminal, in which the number of EPDCCH candidates is independently defined for a case in which the first EPDCCH set and the second EPDCCH set correspond to the first conditions, a case in which the first EPDCCH set corresponds to the first conditions and the second EPDCCH set corresponds to the second conditions, a case in which the first EPDCCH set corresponds to the second conditions and the second EPDCCH set corresponds to the first conditions, and a case in which the first EPDCCH set and the second EPDCCH set correspond to the second conditions.

(10) The terminal according to an aspect of the present invention is the above terminal, in which the number of EPDCCH candidates is independently defined for a case in which at least one of the first EPDCCH set and the second EPDCCH set corresponds to the first conditions, and a case in which the first EPDCCH set and the second EPDCCH set correspond to the second conditions.

(11) A communication system according to an aspect of the present invention is a communication system in which a base station and a terminal communicate using a resource element including one subcarrier and one OFDM symbol, and an RB pair including predetermined resource elements, in which the base station includes an EPDCCH generation unit that maps an EPDCCH used to notify of control information for the terminal to any one of the candidates of the EPDCCH respectively defined for a first EPDCCH set and a second EPDCCH set, which include a plurality of RB pairs, the terminal includes an EPDCCH processing unit that searches for the EPDCCH from the candidates of the EPDCCH, a number of EPDCCH candidates is defined based on a number of RB pairs constituting the first EPDCCH set, a number of RB pairs constituting the second EPDCCH set, conditions for the first EPDCCH set, and conditions for the second EPDCCH set, and the conditions are either first conditions or second conditions different from the first conditions.

(12) A communication method according to an aspect of the present invention is a communication method in a base station that communicates with a terminal using a resource element including one subcarrier and one OFDM symbol, and an RB pair including predetermined resource elements, in which the communication method includes a step of mapping an EPDCCH used to notify of control information for the terminal to any one of the candidates of the EPDCCH respectively defined for a first EPDCCH set and a second EPDCCH set, which include a plurality of RB pairs, a number of EPDCCH candidates is defined based on a number of RB pairs constituting the first EPDCCH set, a number of RB pairs constituting the second EPDCCH set, conditions for the first EPDCCH set, and conditions for the second EPDCCH set, and the conditions are either first conditions or second conditions different from the first conditions.

(13) A communication method according to an aspect of the present invention is a communication method in a terminal that communicates with a base station using a resource element including one subcarrier and one OFDM symbol, and an RB pair including predetermined resource elements, in which the communication method includes a step of searching for an EPDCCH used to notify of control information for the terminal from the candidates of the EPDCCH respectively defined for a first EPDCCH set and a second EPDCCH set, which include a plurality of RB pairs, the number of EPDCCH candidates is defined based on a number of RB pairs constituting the first EPDCCH set, a number of RB pairs constituting the second EPDCCH set, conditions for the first EPDCCH set, and conditions for the second EPDCCH set, and the conditions are either first conditions or second conditions different from the first conditions.

(14) An integrated circuit according to an aspect of the present invention is an integrated circuit realized in a base station that communicates with a terminal using a resource element including one subcarrier and one OFDM symbol, and an RB pair including predetermined resource elements, in which the integrated circuit realizes a function of mapping an EPDCCH used to notify of control information for the terminal to any one of the candidates of the EPDCCH respectively defined for a first EPDCCH set and a second EPDCCH set, which include a plurality of RB pairs, a number of EPDCCH candidates is defined based on a number of RB pairs constituting the first EPDCCH set, a number of RB pairs constituting the second EPDCCH set, conditions for the first EPDCCH set, and conditions for the second EPDCCH set, and the conditions are either first conditions or second conditions different from the first conditions.

(15) An integrated circuit according to an aspect of the present invention is an integrated circuit of a terminal that communicates with a base station using a resource element including one subcarrier and one OFDM symbol, and an RB pair including predetermined resource elements, in which the integrated circuit realizes a function of searching for an EPDCCH used to notify of control information for the terminal from the candidates of the EPDCCH respectively defined for a first EPDCCH set and a second EPDCCH set, which include a plurality of RB pairs, the number of EPDCCH candidates is defined based on the number of RB pairs constituting the first EPDCCH set, the number of RB pairs constituting the second EPDCCH set, conditions for the first EPDCCH set, and conditions for the second EPDCCH set, and the conditions are either first conditions or second conditions different from the first conditions.

DESCRIPTION OF REFERENCE NUMERALS 100 base station
110 PDCCH generation unit
120 EPDCCH generation unit
130 PDSCH generation unit
111, 121, 131 coding unit
112, 122, 132 modulation unit
113, 123, 133 layer processing unit
114, 124, 134 precoding unit
141 terminal-specific reference signal multiplexing unit
151 multiplexing unit
152 transmission signal generation unit
153 transmission unit
200 terminal
201 reception unit
202 reception signal processing unit
203 separation unit
204 channel estimation unit
210 PDCCH processing unit
220 EPDCCH processing unit
230 PDSCH processing unit
211, 221, 231 channel equalization unit
212, 222, 232 demodulation unit
213, 223, 233 decoding unit
1401 macro base station
1402, 1403 RRH
1404 terminal
1408, 1409 line
1405, 1406, 1407 coverage

The invention claimed is:
1. A terminal apparatus configured to communicate with a base station apparatus, the terminal apparatus comprising:
an Enhanced Physical Downlink Control CHannel (EPDCCH) processor configured to and/or programmed to monitor EPDCCH candidates in each of a first EPDCCH set and a second EPDCCH set, the first EPDCCH set and the second EPDCCH set being determined according to a Radio Resource Control (RRC) signaling, wherein
the EPDCCH candidates in each of the first EPDCCH set and the second EPDCCH set are determined at least on a basis of a number of resource elements satisfying a predetermined criteria in one physical resource block pair which is configured for possible EPDCCH transmission of the first EPDCCH set.

2. The terminal apparatus according to claim 1, wherein when the number of resource elements satisfying the predetermined criteria in the one physical resource block pair is smaller than a predetermined number, the EPDCCH candidates in each of the first EPDCCH set and the second EPDCCH set are determined at least on a basis of a first EPDCCH candidate number.

3. The terminal apparatus according to claim 2, wherein when the number of resource elements satisfying the predetermined criteria in the one physical resource block pair is equal to or larger than the predetermined number, the EPDCCH candidates in each of the first EPDCCH set and the second EPDCCH set are determined at least on a basis of a second EPDCCH candidate number.

4. The terminal apparatus according to claim 2, wherein the predetermined number is 104.

5. The terminal apparatus according to claim 1, wherein an OFDM symbol index in a first slot in a subframe of each of the resource elements satisfying the predetermined criteria is equal to or larger than a value configured for the first EPDCCH set.

6. The terminal apparatus according to claim 1, wherein each of the resource elements satisfying the predetermined criteria is included in an enhanced resource element group in a physical resource block pair and is assumed by the terminal apparatus not to be used for transmission of a channel state information reference signal or a cell-specific reference signal.

7. The terminal apparatus according to claim 1, wherein the EPDCCH candidates in each of the first EPDCCH set and the second EPDCCH set are further determined on a basis of a cyclic prefix type, a subframe type, and a Downlink Control Information (DCI) format monitored.

8. The terminal apparatus according to claim 3, wherein the first EPDCCH candidate number is included in a first aggregation level group which does not comprise aggregation level 1,
the second EPDCCH candidate number is included in a second aggregation level group which comprises aggregation level 1.

9. A base station apparatus configured to communicate with a terminal apparatus, the base station apparatus comprising:
an Enhanced Physical Downlink Control CHannel (EPDCCH) generator configured to and/or programmed to map an EPDCCH to an EPDCCH candidate in either a first EPDCCH set or a second EPDCCH set, the first EPDCCH set and the second EPDCCH set being determined according to a Radio Resource Control (RRC) signaling,
the EPDCCH candidate in either the first EPDCCH set or the second EPDCCH set is determined at least on a basis of a number of resource elements satisfying a predetermined criteria in one physical resource block pair which is configured for possible EPDCCH transmission of the first EPDCCH set.

10. The base station apparatus according to claim 9, wherein
when the number of resource elements satisfying the predetermined criteria in the one physical resource block pair is smaller than a predetermined number, the EPDCCH candidate in either the first EPDCCH set or the second EPDCCH set is determined at least on a basis of a first EPDCCH candidate number.

11. The base station apparatus according to claim 10, wherein
when the number of resource elements satisfying the predetermined criteria in the one physical resource block pair is equal to or larger than the predetermined number, the EPDCCH candidate in either the first EPDCCH set or the second EPDCCH set is determined at least on a basis of a second EPDCCH candidate number.

12. The base station apparatus according to claim 10, wherein
the predetermined number is 104.

13. The base station apparatus according to claim 9, wherein
an OFDM symbol index in a first slot in a subframe of each of the resource elements satisfying the predetermined criteria is equal to or larger than a value configured for the first EPDCCH set.

14. The base station apparatus according to claim 9, wherein
each of the resource elements satisfying the predetermined criteria is included in an enhanced resource element group in a physical resource block pair and is not used for transmission of a channel state information reference signal or a cell-specific reference signal.

15. The base station apparatus according to claim 9, wherein
the EPDCCH candidate in either the first EPDCCH set or the second EPDCCH set is further determined on a basis of a cyclic prefix type, a subframe type, and a Downlink Control Information (DCI) format.

16. The base station apparatus according to claim 11, wherein
the first EPDCCH candidate number is included in a first aggregation level group which does not comprise aggregation level 1,
the second EPDCCH candidate number is included in a second aggregation level group which comprises aggregation level 1.

17. A communication method of a terminal apparatus which is configured to communicate with a base station apparatus, the communication method comprising:
monitoring EPDCCH candidates in each of a first EPDCCH set and a second EPDCCH set, the first EPDCCH set and the second EPDCCH set being determined according to a Radio Resource Control (RRC) signaling, wherein
the EPDCCH candidates in each of the first EPDCCH set and the second EPDCCH set are determined at least on a basis of a number of resource elements satisfying a predetermined criteria in one physical resource block pair which is configured for possible EPDCCH transmission of the first EPDCCH set.

18. A communication method of a base station apparatus which is configured to communicate with a terminal apparatus, the communication method comprising:
mapping an EPDCCH to an EPDCCH candidate in either a first EPDCCH set or a second EPDCCH set, the first EPDCCH set and the second EPDCCH set being determined according to a Radio Resource Control (RRC) signaling,
the EPDCCH candidate in either the first EPDCCH set or the second EPDCCH set is determined at least on a basis of a number of resource elements satisfying a predetermined criteria in one physical resource block pair which is configured for possible EPDCCH transmission of the first EPDCCH set.

* * * * *